US011557121B2

(12) United States Patent
Cohen-Tidhar et al.

(10) Patent No.: US 11,557,121 B2
(45) Date of Patent: Jan. 17, 2023

(54) SYSTEM, DEVICE, AND METHOD FOR GENERATING AND UTILIZING CONTENT-AWARE METADATA

(71) Applicant: CLOUDINARY LTD., Petah Tikva (IL)

(72) Inventors: Amnon Cohen-Tidhar, Zoran (IL); Tal Lev-Ami, Modiin (IL)

(73) Assignee: CLOUDINARY LTD., Petah Tikva (IL)

( * ) Notice: Subject to any disclaimer, the term of this patent is extended or adjusted under 35 U.S.C. 154(b) by 199 days.

(21) Appl. No.: 16/858,633

(22) Filed: Apr. 26, 2020

(65) Prior Publication Data

US 2021/0334547 A1 Oct. 28, 2021

(51) Int. Cl.
*G06V 20/40* (2022.01)
*G06F 16/78* (2019.01)
*G06F 16/783* (2019.01)

(52) U.S. Cl.
CPC .......... *G06V 20/46* (2022.01); *G06F 16/7837* (2019.01); *G06F 16/7854* (2019.01); *G06F 16/7867* (2019.01); *G06V 20/41* (2022.01)

(58) Field of Classification Search
CPC .... G06V 20/46; G06V 20/41; G06F 16/7837; G06F 16/7854; G06F 16/7867
USPC ........................................................ 382/103
See application file for complete search history.

(56) References Cited

U.S. PATENT DOCUMENTS

2010/0042642 A1* 2/2010 Shahraray ............ G11B 27/005
707/756
2010/0158099 A1* 6/2010 Kalva .............. H04N 21/23412
375/240.01

* cited by examiner

*Primary Examiner* — Amandeep Saini
(74) *Attorney, Agent, or Firm* — Browdy and Neimark, PLLC

(57) ABSTRACT

System, device, and method for generating and utilizing content-aware metadata, particularly for playback of video and other content items. A method includes: receiving a video file, and receiving content-aware metadata about visual objects that are depicted in said video file; and dynamically adjusting or modifying playback of that video file, on a video playback device, based on the content-aware metadata. The modifications include content-aware cropping, summarizing, watermarking, overlaying of other content elements, modifying playback speed, adding user-selectable indicators or areas around or near visual objects to cause a pre-defined action upon user selection, or other adjustments or modification. Optionally, a modified and content-aware version of the video file is automatically generated or stored. Optionally, the content-aware metadata is stored internally or integrally within the video file, in its header or as a private channel; or is stored in an accompanying file.

35 Claims, 12 Drawing Sheets

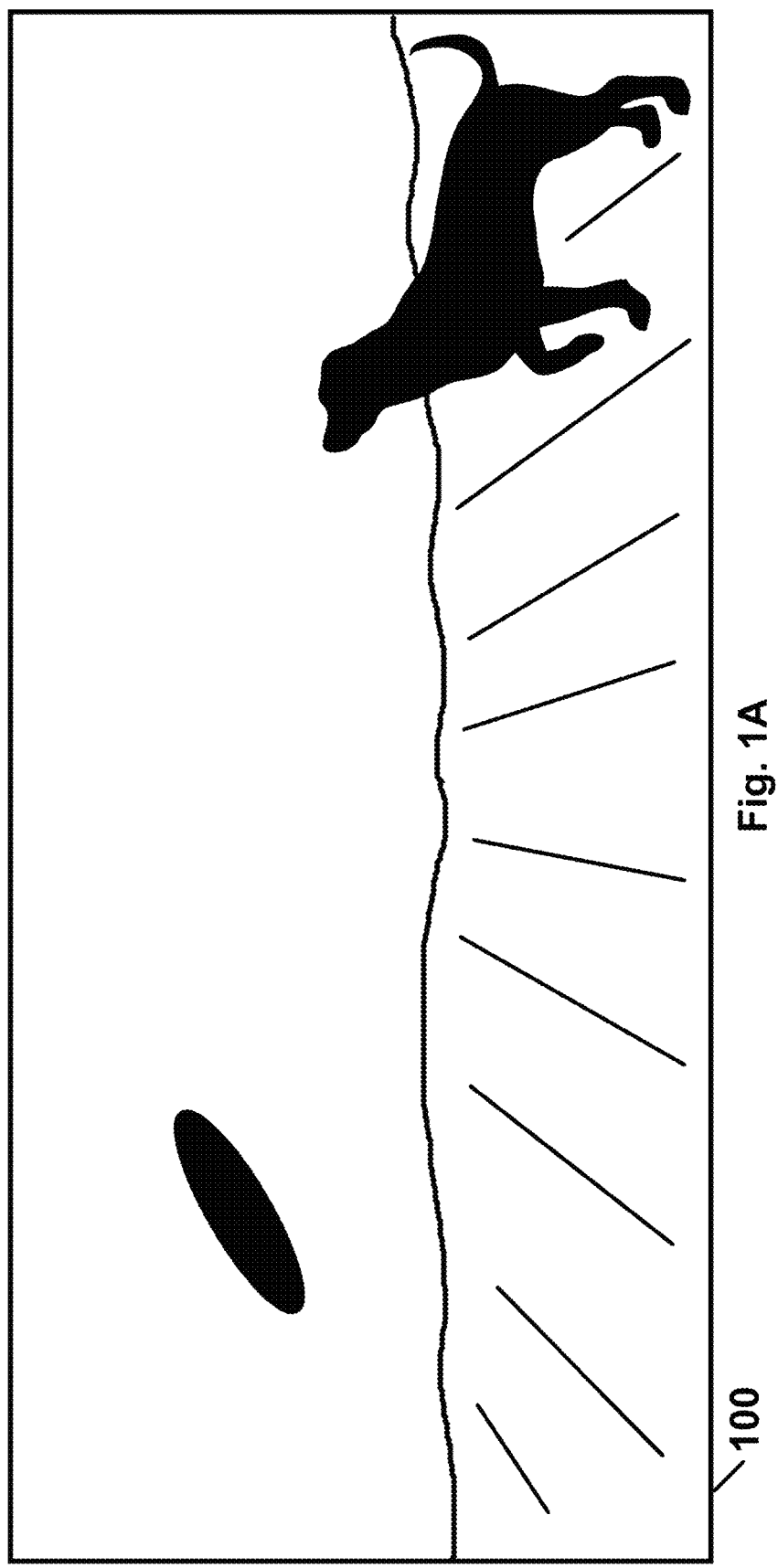

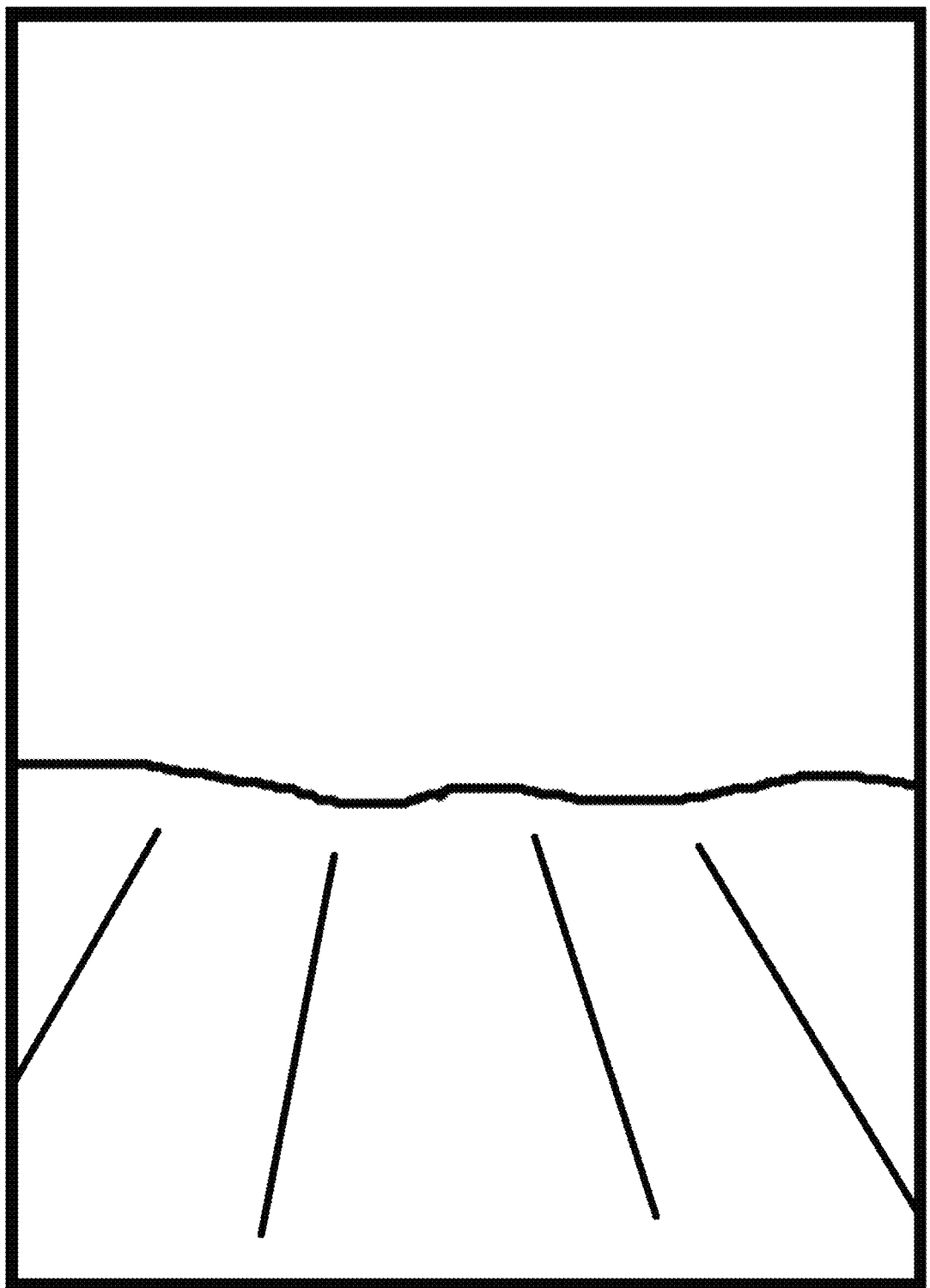
140    Fig. 1C

SYSTEM, DEVICE, AND METHOD FOR GENERATING AND UTILIZING CONTENT-AWARE METADATA

FIELD

The present invention relates to communication systems and electronic devices.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, engaging in Instant Messaging (IM) and video conferences, playing games, or the like.

SUMMARY

The present invention provides systems, devices, and methods for generating and utilizing content-aware metadata, particularly for playback of video and other content items. For example, a method includes: receiving a video file, and receiving content-aware metadata about visual objects that are depicted in said video file; and dynamically adjusting or modifying playback of that video file, on a video playback device, based on the content-aware metadata. The modifications include content-aware cropping, summarizing, watermarking, overlaying of other content elements, modifying playback speed, or other adjustments. Optionally, a modified and content-aware version of the video file is automatically generated or stored. Optionally, the content-aware metadata is stored internally or integrally within the video file, in its header or as a private channel; or is stored in an accompanying file.

Embodiments of the present invention may provide other and/or additional benefits and/or advantages.

BRIEF DESCRIPTION OF THE DRAWINGS

FIG. 1A is an illustration of a frame, for which content-aware metadata may be generated and utilized, in accordance with some embodiments of the present invention.

FIG. 1C is an illustration of a cropped frame produced via content-agnostic cropping, as generated by a conventional (prior art) playback application that agnostically crops frames.

DETAILED DESCRIPTION OF SOME DEMONSTRATIVE EMBODIMENTS

Figure 1B:
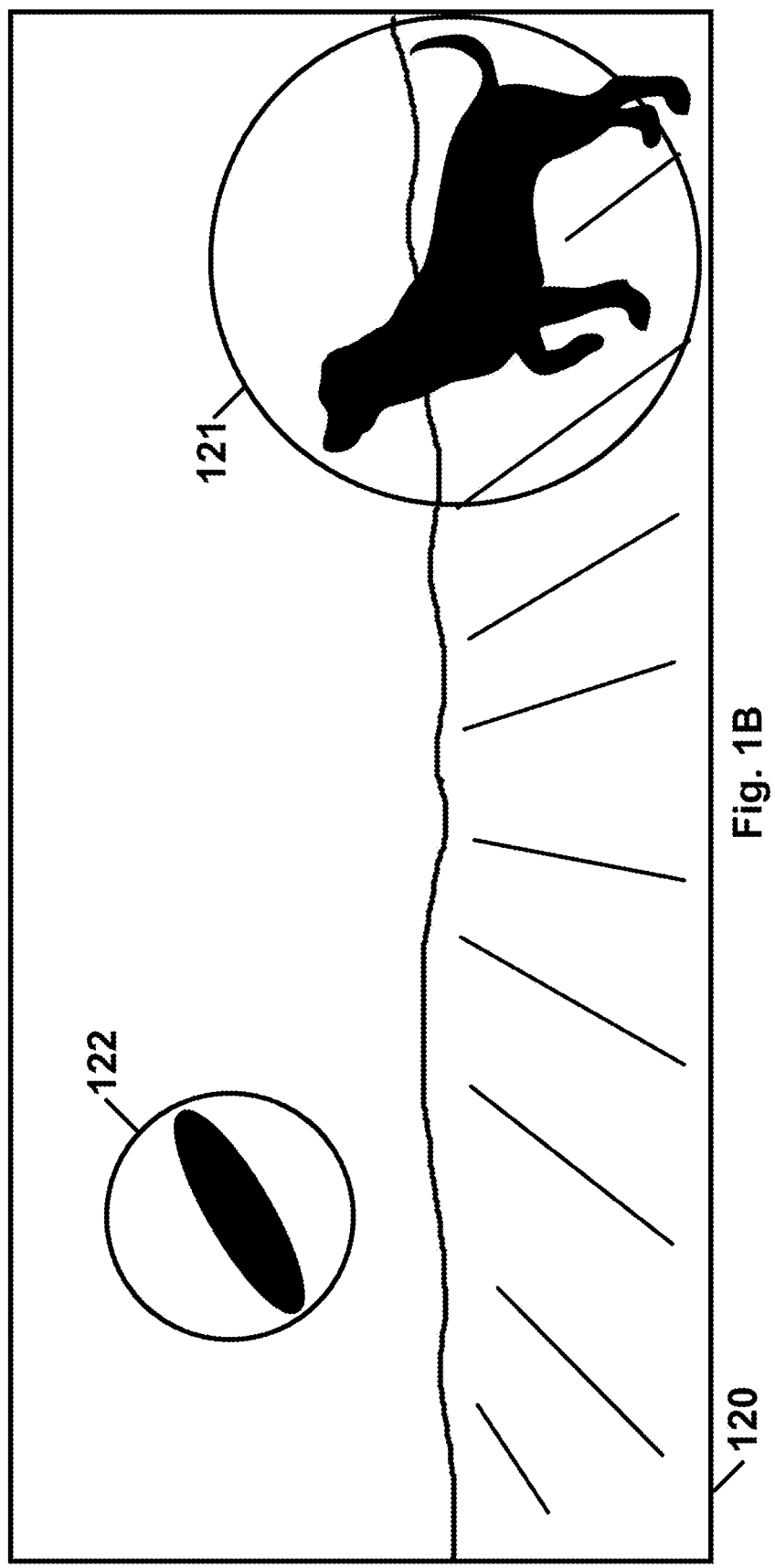
FIG. 1B is an illustration of a content-aware importance map, that may be generated and utilized in accordance with some demonstrative embodiments of the present invention.

Some embodiments provide systems, devices, and methods for generating and/or utilizing new types of metadata, that accompanies a media item or a multimedia item or a content item (e.g., a video file or stream, an audio/video file or stream), or that is embedded or otherwise integrated in such media item; and particularly, metadata related to (or describing, or indicating) one or more spatial and/or temporal properties or objects that are of interest and/or that are of reduced-interest and/or that are of increased-interest, and/or other information or metadata about level of interest of one or more scenes or objects or other content-item within a multimedia file or stream.

In some embodiments, such metadata may be generated manually, automatically, or semi-automatically; and may be subsequently utilized by a playback device or an end-user device, for one or more purposes; for example, for efficient and content-aware cropping or trimming or re-sizing of the multimedia item (or portions thereof), for content-aware watermarking, for content-aware overlaying or positioning or placement of additional content (e.g., captions, closed captions, subtitles, logo, watermark), for content-ware modification or adjustment of aspect ratio, for content-aware removal or deletion or hiding of one or more frames or frame-portions, or the like.

The Applicants have realized that media content or multimedia content (e.g., video file or stream, audio/video file or stream, images, photographs, animated content, or the like) is not necessarily bound to a specific end-user playback device or to a particular viewing method or content consumption method. The same media content may be viewed on a variety of content consumption devices, for example, a television screen, a screen or monitor of a desktop computer, a laptop computer, a smartphone, a tablet, a smart-watch, or the like. Moreover, even on the same end-user device, the same media content may be viewed in different ways; for example, using different aspect ratios or occupying a different portion of the screen space; such as, depending on the device orientation (e.g., portrait or landscape), depending on whether the content is viewed in full-screen mode or in a dedicated tab or window or embedded (e.g., within an application or a web-page), depending on a zoom level or a resizing operation that the user may request, depending on the particular type of playback application, or the like.

The Applicants have realized that end-user devices, and the playback or content consumption applications that run on them, agnostically adjust the media content to the available or the desired display size, typically by agnostically shrinking the media and leaving part of the display area empty (or, having "black bars" on two edges of the screen), or by agnostically cropping (e.g., leaving only a central region thereof, or leaving only a central portion of each frame of a video) to fit the allocated display space, or some other agnostic combination of these two methods. The Applicants have realized that such conventional adjustments are agnostic to the content being consumed, or are content-agnostic rather than being content-ware. The Applicants have realized that conventional and content-agnostic adjustments may lead to low-quality results; for example, in the case of content-agnostic shrinking, resulting in an outcome that is very small in size, losing important details and wasting valuable display area; or, in the case of content-agnostic cropping or trimming, losing or discarding important visual data which sometimes gets cropped out and cannot be viewed by the user.

The Applicants have realized that conventional media files may store metadata with basic information, such as, date and time (and sometimes also location) in which the media was created, or indication of a codec that was used. However, realized the Applicants, conventional media files lack metadata or information about in-frame location of more important or less important visual objects or visual details, and lack metadata or information about the level of important of particular frame-portions or subjects or objects that are depicted in the media content.

The present invention includes systems, devices, and methods—as well as a format—for utilizing, generating and/or adding content-aware metadata or a content-aware information channel, to a media file or a media stream. The content-ware metadata or the content-aware information channel informs the content-consumption application or the content-consumption device with regard to increased-importance visual portions of the media and/or with regard to reduced-importance visual portions of the media, and regarding the temporal and/or spatial distribution or location(s) of such increased-important and reduced-importance visual data-portion(s) of the media. Such additional content-aware metadata or information channel may enable the end-user device, via a suitable content-aware playback application or a content-aware media consumption application, to correctly and non-agnostically perform one or more adjustment to the media; for example, re-resizing it, cropping it, trimming it, shrinking it, enlarging it, performing smart or content-aware zoom operations, placing or positioning a watermark or an overlay or an additional content layer or content item (e.g., logo, subtitles, captions, closed captions), adjusting or modifying the media to the required or the available display area, performing selective cropping or selective trimming or selectively discarding of reduced-importance or non-important visual portions of a frame, ensuring that increased-importance visual portions of a frame (e.g., which are determined or detected or recognized automatically or autonomously by the system; or, which are selected or indicated by the user, for example, by selecting or circling or boxing or otherwise indicating a particular on-screen/visual object-of-interest that would be handled by the system as an increased-importance object) are maintained or are kept or are indeed displayed on the screen and are not discarded or hidden, selectively reduced-important parts of a frame, selectively keeping or maintaining or showing the increased-importance parts of a frame or keeping them intact; or performing other content-aware adjustment or content-aware modifications, or achieving an improved content-aware playback, based on such content-aware metadata or information channel.

Some embodiments may enable, for example, a video playback application on a smartphone to immediately or dynamically modify the aspect-ratio of a displayed video file, during the playback of such video, and even (in some implementations) performing such dynamic modification several times during a single playback of a single video on a single device, in response to changes in of the device orientation by the user, and based on content-aware metadata that indicated where and when increased-importance/reduced-importance visual data exists. Some embodiments allow the end-user device or the content consumption device to efficiently and correctly utilize 100 percent of the available screen real estate (e.g., the entirety of the screen; or, the entirety of the window or tab that is allocated for playback) for the purpose of displaying the media content without cropping-out or discarding or hiding or distorting any important visual content or any increased-importance visual content.

In some embodiments, additionally or alternatively, the content-aware metadata or parameters or information channel, may be utilized by one or more other client-side applications or modalities; for example, to perform content-aware overlay or placement or positioning of visual elements (e.g., watermark, subtitles, captions, closed captions), for performing content-aware trimming and content-ware smart trick-play (e.g., visible fast forward or rewind).

In some embodiments, optionally, the content-aware metadata of the present invention may be utilized by a web browser of an application or "app", or by a plug-in or extension or add-on to a web-browser or to such application or "app", in order to dynamically adjust or dynamically modify the manner in which a media content (e.g., a video file, or a video stream) is displayed.

In some embodiments, optionally, the content-aware metadata of the present invention may be utilized by a content editing or content authoring program or application or device, in order to automatically perform (or, to propose to perform) one or more media editing operations or video editing operations; for example, thereby enabling a video editing program to perform selective and content-aware cropping or trimming or re-sizing of frame(s) of a video, based on such content-aware metadata.

In accordance with the present invention, content-aware metadata which may be generated with regard to a single frame, or with regard to a set or group or batch of frames, or with regard to a video-segment, or with regard to an entirety of a video file or video stream (or image, or animated sequence, or other media content). The metadata may be generated by a human author or human creator of the media content; or by a video authoring or video creation or video editing tool or program or application (e.g., automatically, or semi-automatically with human or manual confirmation or supervision); or by other content creation or content editing or content authoring tool or program or application; or by a tool or unit or device that automatically analyzes an already-created video or media content for the purpose of generating the content-aware metadata for it. In some embodiments, optionally, automatic or semi-automatic generation of the content-aware metadata may be performed by a server computer, or via a unit that is part of a cloud-computing platform or that is part of a Content Delivery Network (CDN) or as part of a content distribution platform. In some embodiments, optionally, automatic or semi-automatic generation of the content-aware metadata may be performed by utilizing one or more object detection algorithms and/or saliency detection algorithms; optionally utilizing an Artificial Intelligence (AI) process or a Machine Learning (ML) process; optionally utilizing a dataset for training purposes, or for defining classifiers or for determining clustering of data-points; and/or by using one or more computer vision algorithms.

The generated content-aware metadata may be stored internally within the media file or media stream; and/or in a header portion thereof; and/or in (or as) a particular channel thereof; or may be appended to it, or may precede it; or may be stored separately yet may be linked or otherwise associated with it (e.g., as an addendum file of metadata, or as an accompanying file, or as a record or a field in a database or a linked list, or the like). In some embodiments, the content-aware metadata may be embedded within the media file or media stream itself (e.g., as a private stream in an MPEG-4 or MP4 file or stream); and/or may be part of an external file or item or list, such as in WebVTT or XMP or JSON or XML or other format, accompanying the media file (e.g., a "sidecar" file or item; similar, for example, to a Subtitles file that accompanies a video file).

In a demonstrative embodiments, the content-aware metadata may include the following fields or parameters or indicators: (A) Frame Number, indicated in a suitable format, such as in a format of "hh:mm:ss:fr", wherein "hh:mm:ss" indicates hours, minutes and seconds that elapsed from the beginning of the video or content item, and wherein "fr" indicates the number of frames offset; (B) Time Length, indicated in a suitable format, such as "hh:mm:ss.mmm", wherein "mmm" counts milliseconds; (C) Object ID, which is a unique identifier (e.g., a unique number, or a unique string) that identifies a particular object or subject that is visually captured in the media content; (D) Object Name, which indicates a name or a keyword or a textual description (e.g., using a natural language, such as English) given to that Object, e.g., "Red Dress" or "Girl" or "Basketball"; (E) Object Position, represented in one or more suitable positioning scheme or coordinates system (e.g., as demonstrated further herein); (F) Importance Value, or level of importance, or level of priority to maintain or keep the Object and not to discard it and not to hide it or overwrite it, related to a particular Object in the frame, and indicating the level of importance within a pre-define scale (e.g., from 0 to 100, wherein 0 indicates a non-important Object that may safely be discarded or cropped-out or overwritten, and wherein 100 indicates a crucial or highly important Object that may not or should not be discarded or cropped-out or overwritten); (G) Importance Distribution, indicating the distribution of importance levels within the Object's bounding rectangle or circle (or other pre-defined shape or polygon); for example, indicating a uniform distribution such that same level of importance is assigned to every pixel in the Object's bounding shape, or indicating a Gaussian distribution which assigns a higher level of importance to pixels that are closer to the center of the bounding shape of the Object. Other and/or additional and/or alternate parameters or fields or metadata-items may be generated and/or utilized.

In some embodiments, only a single Object may be detected and assigned in each Frame. In other embodiments, which may be more useful for some purposes or some implementations, two or more different (or distinct, or discrete) Objects may be detected or recognized or indicated in one single Frame, and each such Object may be registered with its own metadata information.

The parameter or field of Object Position, denoted (E) in the above list, may be indicated using one or more suitable representation schemes; for example: (E1) a Rectangle defined by two opposite corners, using coordinates of (x1, y1, x2, y2), wherein [x1, y1] are the coordinates of the top-left corner of a rectangle containing the Object, and wherein [x2, y2] are the coordinates of the bottom-right corner of that rectangle; (E2) a Rectangle defined by its top-right corner (x1, y1), and by its width (w) and its height (h), using the format (x1, y1, w, h); (E3) a Rectangle defined by the coordinates (x, y) of the center point of the Object, and by the width (w) and the height (h) of the rectangle, using the format (x, y, w, h); (E4) a Circle defined by the coordinates of its center point and by its radius, in the format (x, y, r); or the like. In some embodiments, the Object Position may be represented or indicated by utilizing a scaled-down version of the original Frame, and by assigning levels of importance to particular pixels or groups-of-pixels or clusters-of-pixels.

In some embodiments, coordinates and/or dimensions (e.g., width, height, radius) may be represented in pixels (e.g., r=35 indicates a radius of 35 pixels around a central point of a circle); or may be represented as a percent value indicating a percentage from a relevant overall dimension (e.g., w=25 or w=25% indicates a rectangle-width which is 25 percent the width of the entirety of the frame width). Other representation schemes may be used.

Reference is made to FIG. 1A, which is an illustration of a Frame 100, for which content-aware metadata may be generated and utilized, in accordance with some embodiments of the present invention. Frame 100 may be, for example, part of a video file or a video stream. Visually depicted in Frame 100 are several visual elements, for example: (a) a black dog, located generally at the bottom-right region of the frame; (b) a green background of grass and trees, occupying generally the bottom third of the frame; (c) blue sky, occupying generally the top two-thirds of the frame; (d) a frisbee, located in a particular region of the frame (e.g., approximately at one-third of the frame's width from the left edge of the frame, and approximately one-quarter of the frame's height from the top edge of the frame).

An analysis of frame 100, by an automated process or computer vision algorithm or other suitable technique, or manually by a human inspector, may identify that there are two Objects in frame 100 that should be associated with an increased-importance indicator: the dog, and the freebie. Additionally or alternatively, a similar analysis may indicate that the green grass and the blue sky are two other Objects that should not be allocated an increased-importance indicator, or, that those two Objects may be allocated (in some implementations) a reduced-important indicator, or, that those two Objects need not be mentioned at all in the content-aware metadata (e.g., in implementations that generate and/or utilize content-aware metadata only to Objects that are assigned increased importance, and not to other types of objects, such as objects having regular importance or reduced importance).

In some embodiments, the analysis may be performed across multiple frames, in order to reach a determination that would be utilized in at least one of those frames, or in some or all of those frames. For example, frame 100 may be one frame out of a set of 90 frames of a video clip which spans 3 seconds (at 30 frames per second, 30 FPS); and an analysis or an inspection of those 90 frames, including a computerized comparison of those frames or frame-portions thereof, may yield the determination that the dog and the Frisbee should be assigned increased importance since these Objects move within the video (e.g., relative to the edges of the video), whereas the green grass and the blue sky should not be assigned an increased importance as they are generally static or non-changing or non-moving.

In a demonstrative embodiment, the analysis of frame 100 may generate the content-aware metadata, which may be stored in a WebVTT (web video text tracks) or other suitable format, as demonstrated herein in Metadata List 1; the text that appears to the right of the "//" symbols is not part of the metadata and is only shown for explanatory purposes:

Metadata List 1

```
WEBVTT
...
2048                                       // Frame Number
00:02:08.246 --> 00:02:08:297              // Start time --> End time
{
"type":        "Obj Position",
"id":          "2",                        // First Object ID
"name":        "Dog",                      // First Object Name
"polar_coord": "84, 89, 14",               // Polar Coordination of First Object
"importance":  "90",                       // Importance Level of First Object
"distribution":"gauss",                    // Distribution of Importance of First
                                              Object
"id":          "6",                        // Second Object ID
"name":        "Frisbee",                  // Second Object Name
"polar_coord": "29, 25, 4",                // Polar Coordination of Second
                                              Object
"importance":  "30",                       // Importance Level of Second
                                              Object
"distribution":"gauss",                    // Distribution of Importance of
                                              Second Object
"click action" "open url"                  // player action when viewer clicks
                                              on the object
"link"         "http://url.to.open"        // data associated with the action
}
```

The information shown in the demonstrative Metadata List 1 may correspond to the following information, or may be interpreted by a content consumption or content playback tool or application as follows: In frame number 2048, that starts after 2 minutes, 8 seconds and 246 milliseconds from the beginning of the video clip, there are two Objects that are identified with their respective Visual Importance data: one object is a Dog, with its center being located at 84% of frame width (from the left) and 89% of frame height (from the top) with a radius of 14% (of frame width) and with an Importance Level of 90%; and a Frisbee, with its center being located at 29% of frame width (from the left) and 25% of frame height (from the top) with a radius of 4% (of frame width) and with an Importance Level of 30%. In some implementations, such metadata may relate to a single frame of the video. In other implementations, a single such list of metadata may relate to a batch or set of several frames; for example, in the above example, to each frame within the video-segment that starts at time-point 00:02:08.246 and ends at time-point 00:02:08:297. As demonstrated in the above Metadata List 1, in some embodiments, optionally, the meta-data for a particular object may include a URL or URI or other resource locator or pointer or shortcut, that the end-user device or application will open or launch or otherwise access upon selecting (clicking, tapping, double tapping, or the like) this particular object while the content (e.g., video) is displayed or played. In some embodiments, such meta-data may indicate, for example, which action to take (e.g., "open" a URL; or "save" a file; or "share" a frame or a video; or the like), and/or which URL or URI or other pointer or shortcut such action should relate to.

Reference is made to FIG. 1B, which is an illustration of a content-aware importance map 120, that may be generated and utilized in accordance with some demonstrative embodiments of the present invention. In map 120, a first circle 121 indicates the in-frame location and size of the first object (dog); and a second circle 122 indicates the in-frame location and size of the second object (frisbee).

Reference is made to FIG. 1C, which is an illustration of a cropped frame 140 produced via content-agnostic cropping of frame 100, as generated by a conventional (prior art) playback device or playback application that agnostically crops frame 100 to fit it into a screen of a smartphone held in portrait orientation with an aspect ratio of 9:16. As shown in FIG. 1C, the content-agnostic cropping yields a cropped frame-portion that includes almost none of the "visually important" objects of the original 100; discarding the visually important objects (dog, frisbee), and maintaining only the other frame portions which are less visually important (central area of green grass and blue sky).

Figure 1D:
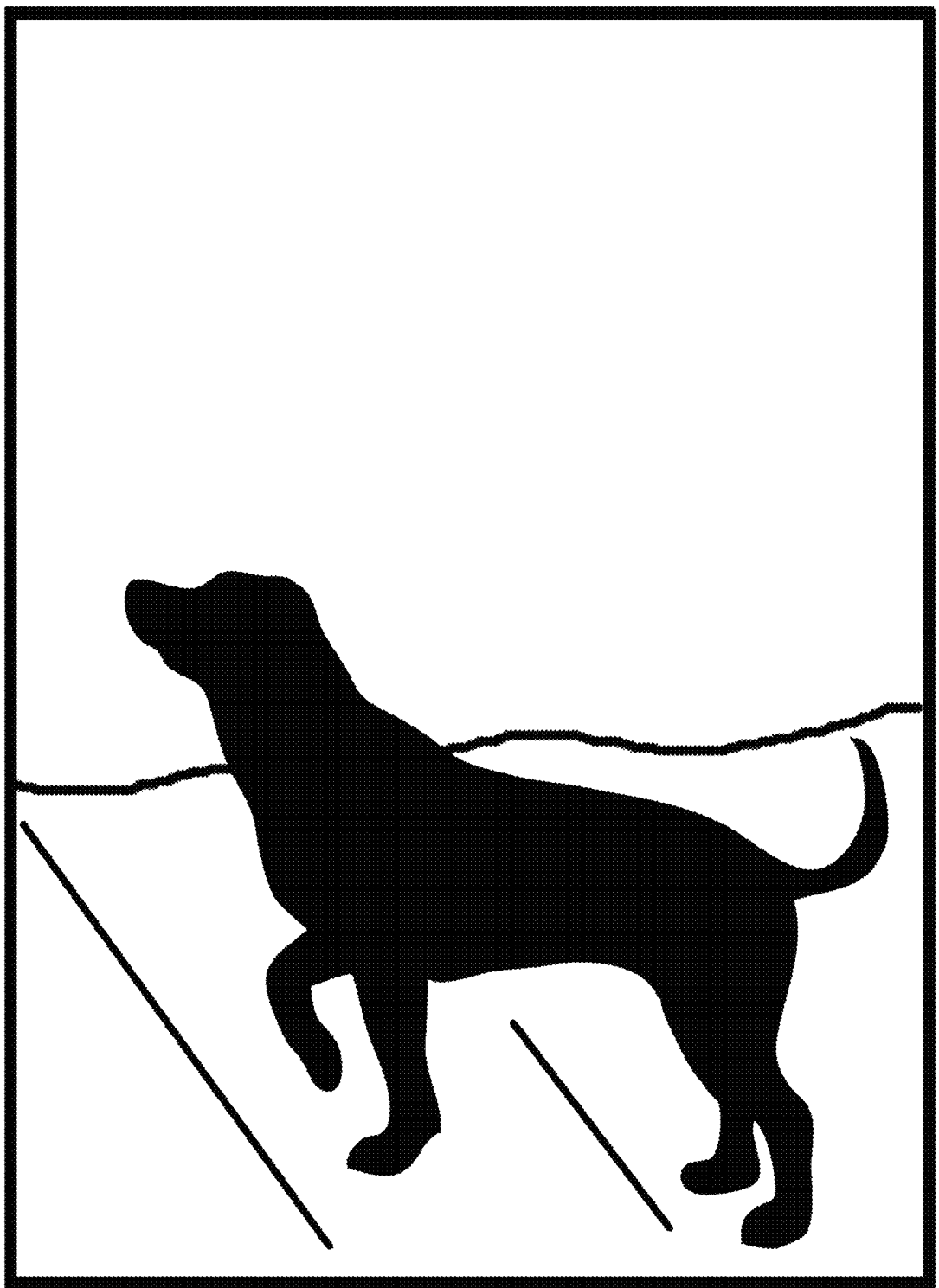
FIG. 1D is an illustration of a cropped frame produced via content-aware cropping, as generated by a playback device or playback application in accordance with some demonstrative embodiments of the present invention.

Reference is made to FIG. 1D, which is an illustration of a cropped frame 160 produced via content-aware cropping of frame 100, as generated by a playback device or playback application in accordance with the present invention, which agnostically crops frame 100 to fit it into a screen of a smartphone held in portrait orientation with an aspect ratio of 9:16. As shown in FIG. 1D, the content-agnostic cropping yields a cropped frame-portion that includes the entirety of the first object (dog) which had a visual importance score of 90%; while discarding much of the non-important portions of the original frame (green grass and blue sky, except when they are nearby the dog object).

In some implementations, as demonstrated in FIG. 1D, cropped frame 160 does not show and does not include the second object (frisbee), which had been assigned an importance score of 30%. For example, the content playback device or program may be configured, to discard objects or frame-portions that have an importance level or an importance score that is below a pre-defined threshold value (e.g., below 50%, or below 75%). In some implementations, such threshold may optionally be associated with one or more pre-defined conditions; for example, an in-frame distance condition may be applied or enforce, such that a secondary-importance object (e.g., having an importance score in the range of 25 to 50 percent), would be included in the cropped frame, only if the centers of the two objects (the primary importance object and the secondary importance object) is not more than 18 percent of the frame width. Other conditions or criteria may be used on the playback device and/or by the playback application, to configure and to determine, dynamically, which object(s) to include or to discard when performing the content-aware cropping. Accordingly, in some implementations, the content-aware cropped version of frame 100, may include both the primary object (dog) and the secondary object (frisbee), if threshold values or conditions or other rules are applied to allow for their inclusion.

In some embodiments, the playback device or playback program may perform content-aware cropping based on pre-defined frame-regions, in order to slightly simplify the implementation of such cropping. For example, in a demonstrative implementation, the frame width may be divided into four equal-size vertical columns; the playback program may determine from the metadata that there is a single high-importance object (e.g., only the Dog object; as it is the only object having an importance score of over 50 percent, for example); may further determine that the Dog object is located, in its entirety, within the two right-most vertical columns (vertical quarters) of the frame; that this statement holds true over a batch or set of frames (e.g., across the next 90 frames, or across the next 3 seconds of video at 30 FPS); and may thus determine to crop each one of these 90 frames by cropping-out (discarding) the left half of the frame and by cropping-in (keeping) the right half of the frame. This is only a non-limiting example; and a playback or consumption application or device may be configured to utilize a different in-frame mapping or division into columns and/or rows and/or frame-regions, in order to apply content-aware cropping that maintains Objects of high importance, and that discards other frame regions (e.g., frame regions that do not include any identified Object; and frame regions that include an identified Object having an importance score that is (for example) below a pre-defined threshold value); thereby ensuring that the most visually-important object(s) remain within the content-aware cropped frame(s). In some embodiments, additionally or alternatively, comparison to a pre-defined threshold value need not necessarily be used; rather, some implementations may be configured to perform content-aware cropping that maintains the Object having the highest or greatest importance score or importance value, out of one or more Objects that are within a video or a video-segment or a frame; or by cropping the video or the frame to include the Object having the greatest importance score and by also leaving and keeping "margins" around such Object (e.g., adding an extra 10 percent to the width and the height of that Object, for cropping purposes). In some other implementations, the device or the application may be configured (e.g., automatically, or by the user) to perform content-aware cropping that keeps within the displayed area only the N objects having the highest values of importance scores; such that, for example, if N equals 3, and there are 7 recognized Objects in the frame, the content-aware cropping will operate to generate cropped frame(s) that maintain at least the three Objects (out of the total seven Objects) that have the highest importance score values. In other embodiments, the device or the playback application may perform content-aware cropping that maintains two or more Objects that have, cumulatively, a pre-defined threshold value of importance scores; or to maintain at least N objects within a frame; such that, for example, at least the Dog object and the Frisbee object would be included and visible in such content-aware cropping. In some embodiments, optionally, the device may be configured to perform partial cropping-out of a minority of an area of an Object, that was generally classified as a high-importance object, in order to maintain within the cropped frame also another Object; for example, enabling the device to partially crop-out the Tail section of the Dog object, in some frames, in order to ensure that both the Dog (or a majority of the area of the Dog object) and the Frisbee are maintained as cropped-in content. Other suitable rules or conditions may be applied or enforced by the end-user device or the content playback device or application.

Some embodiments may enable automatic or semi-automatic content-aware cropping (or dynamic display adjustment) based on user selection or user indication of an object-of-interest or of several such user-indicated objects-of-interest. For example, during the playback of a video, and/or while the video is paused or stopped, the user may tap or click or swipe over, or otherwise select, one particular Object on the screen; the device may detect that the user-selected area contains a particular Object that has metadata; and the playback application or playback device may proceed based on a current ad hoc user-selected indication that this particular Object should be handled as an object-of-interest, such that content-aware cropping should be performed in a manner that keeps or maintains or crops-in that particular object-of-interest, and that continues to track and include that particular object-of-interest and across subsequent frames of this video. Similarly, the user may select two (or more) objects-of-interest, such that the playback device will proceed by ensuring that at least the two selected objects-of-interest are shown, out of a greater number of objects which are recognized and which have corresponding metadata.

In some embodiments, the content-aware cropping may be performed dynamically or on-the-fly, or in real-time or in near-real-time, as the playback or content-consumption program (or device) decodes video and/or prepares it for presentation. In other embodiments, optionally, the content consumption program or device may optionally perform an optional "initial pass", in which it analyzes the content-aware metadata for a video file, in order to determine where and when to perform content-aware cropping for the purpose of aspect-ratio adjustment; such optional "initial pass" may be performed, for example, when the end-user device is idle (e.g., by a background process of a Video Gallery or Video Playback application); or, in some implementations, may optionally be performed rapidly immediately upon receiving the end-user's command to playback the video; and the results of such optional "initial pass" may be a shortened list of cropping metadata, such as: in the first 60 frames, crop-out the left half of each frame, while maintaining a smooth transition (e.g., without abrupt "jumps" of object(s) on the screen); and in the next 90 frames, crop-out the right half of each frame. In some embodiments, such information generated by an optional "initial pass", may remain in the RAM memory of the playback device, and need not be stored long-term; whereas, in some implementations, such additional "cropping metadata" may be added to the video file itself (similarly to the content-aware metadata itself), or may be stored in an accompanying file or a "sidecar" file.

In some embodiments, the content-aware cropping may be performed by a video editing program or application or tool, based on the content-aware metadata that had been generated (e.g., by a remote server, or by the same device) for a particular video. For example, a developer downloads a two-minute MP4 video clip that was captured by another entity; the original video was captured with Landscape orientation; and the developer intends to embed that video within a web-site or an "app" that would be viewed on smartphones in Portrait orientation. The developer indicates to the video editing (or video conversion) tool or program, that he wants to achieve this goal. In some embodiments, the video editing (or video conversion) tool or program operates to analyze the MP4 video, and to generate for it content-aware metadata about identified Objects and their levels of importance, such that the content-aware metadata that was generated in one system or by one platform or server (e.g., automatically, semi-automatically, or manually) would be carried and transported to playback devices and content-consumption devices and applications without the need for a recipient device or a recipient application to re-process the video or content. In some embodiments, such content-aware metadata may optionally already be included in the MP4 video (e.g., it had been generated by a remote server and was included in the MP4 video as a private channel) or may optionally be obtained from an accompanying file or from a "sidecar" file. The video editing (or conversion) tool proceeds to perform content-aware cropping of the MP4 video, frame by frame, by taking into account the identified Objects, and their locations and sizes, as indicated by the content-aware metadata. The video editing (or conversion) program or tool proceeds to generate a content-aware cropped version of the original MP4, which now maintains the frame-portions that include visually-important objects, and that discards frame-portions that do not include visually-important objects. The content-aware cropped version of the MP4 video may then be saved by the developer, and may be embedded into the "app" or web-page or web-site that he is developing; or may be otherwise sent or shared or posted in its content-aware cropped version.

Figure 2A:
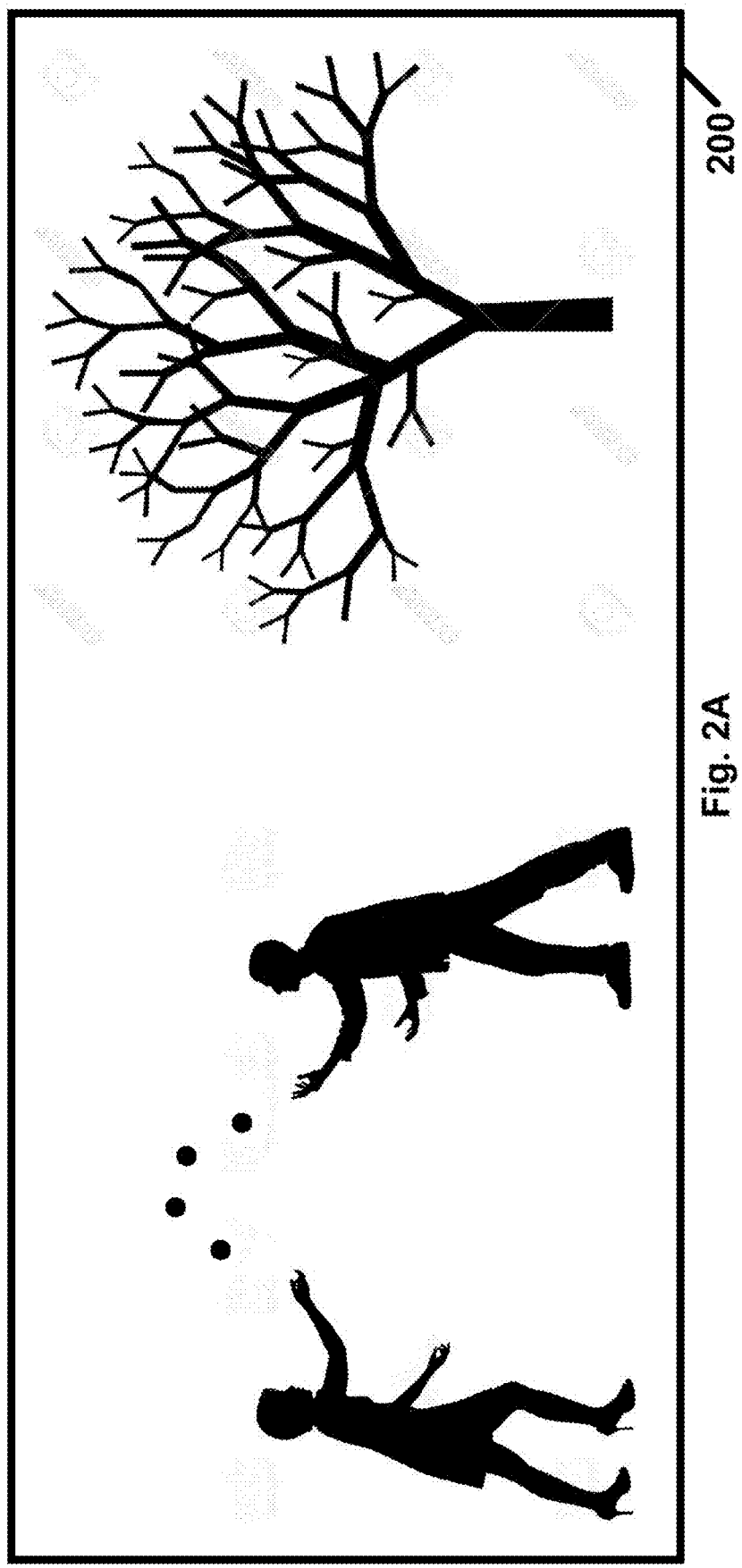
FIG. 2A is an illustration of a frame taken from a video, depicting multiple objects, in accordance with some demonstrative embodiments of the present invention.

Reference is made to FIG. 2A, which is an illustration of a frame 200 taken from a video, in accordance with some demonstrative embodiments of the present invention. Frame 200 depicts two humans playing with (or juggling) balls, and a nearby tree.

Figure 2B:
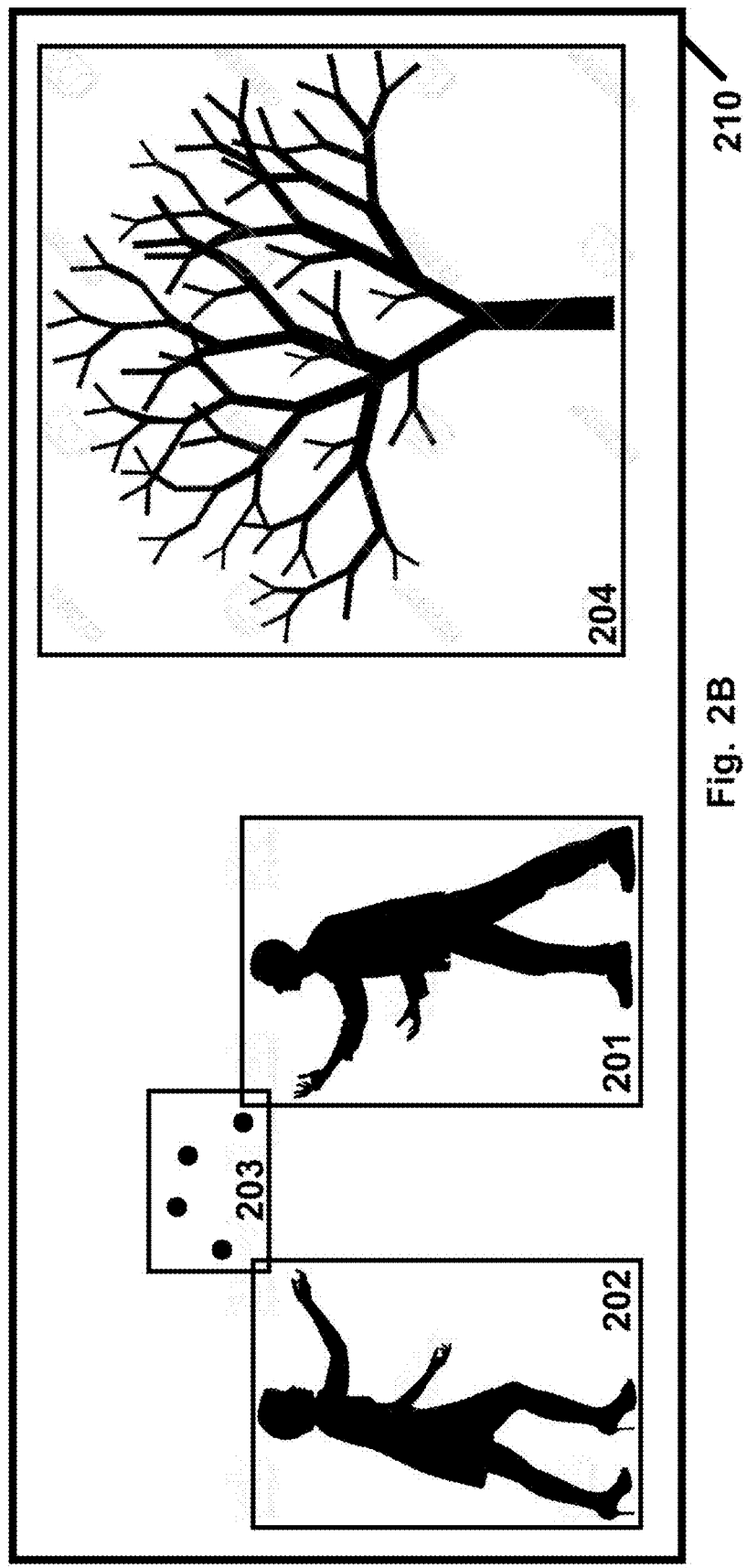
FIG. 2B is an illustration of a frame, showing therein indications corresponding to content-aware metadata as generated and/or utilized in accordance with the present invention.

Reference is made to FIG. 2B, which is an illustration of a frame 220, which is a copy of frame 200 yet it further shows therein indications corresponding to content-aware metadata as generated and/or utilized in accordance with the present invention. For example, a video analysis unit may utilize an object saliency or object detection or computerized vision process, to analyze frame 200 by itself, and optionally also by taking into account other frames that precede it or that follow it, such as by comparing frames or frame-portions to detect moving and/or non-moving elements, or changing or non-changing elements). The analysis result may be that frame 20 (or its copy, frame 200) includes: a first object (e.g., "Human-1") having an importance score of 95% and having a rectangular boundary 201 that is a vertically-elongated rectangle; a second object (e.g., "Human-2") having an importance score of 94% and having a rectangular boundary 202 that is a vertically-elongated rectangle; a third object (e.g., "Balls") having an importance score of 88% and having a rectangular boundary 203 that is a horizontally-elongated rectangle; and also a fourth object (e.g., "Tree") having an importance score of 14% (since it is non-changing and non-moving across all the frames or across multiple frames or numerous frames) and having a rectangular boundary 204 that is generally squared.

As demonstrated in FIG. 2B, it is possible, in some implementations, that the boundaries or frame-regions of two or more objects, may partially overlap or may cross each other; such that in some implementations, a particular pixel or a particular cluster of pixels in a frame, may belong to two or more discrete objects, having two or more (respective) visual importance values or visual importance scores. This may occur since, for example, some embodiments may define objects by using particular types of geometric shapes (e.g., rectangle, square, circle) and thus a boundary of an object may not necessarily be confined to the immediate contour or silhouette of such object, but may also include some nearby pixels; and such nearby pixels of Object 1 may also be, due to their in-frame location, nearby pixels relative to Object 2.

Figure 2C:
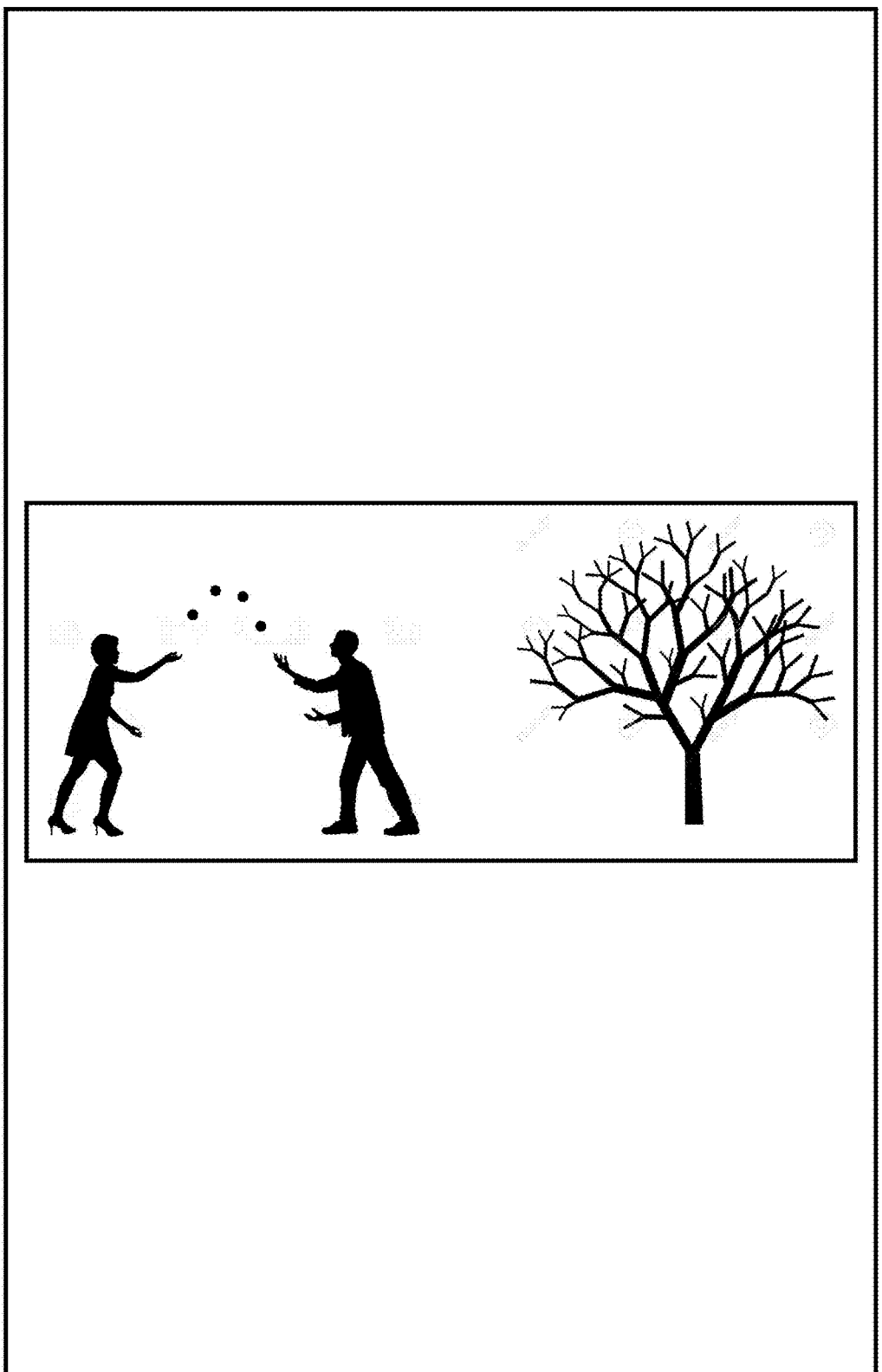
FIG. 2C is an illustration of a screen of a smartphone, held in portrait orientation, agnostically playing a video having an original video frame utilizing only a fraction of the available display area.

Reference is made to FIG. 2C, which is an illustration of a screen 230 of a smartphone, held in portrait orientation, agnostically playing a video having the original frame 200. As demonstrated, the frame occupies only approximately 25 percent of the entire available screen real estate, and the objects in frame are visually very small, making it difficult for a viewer to notice fine details therein.

Figure 2D:
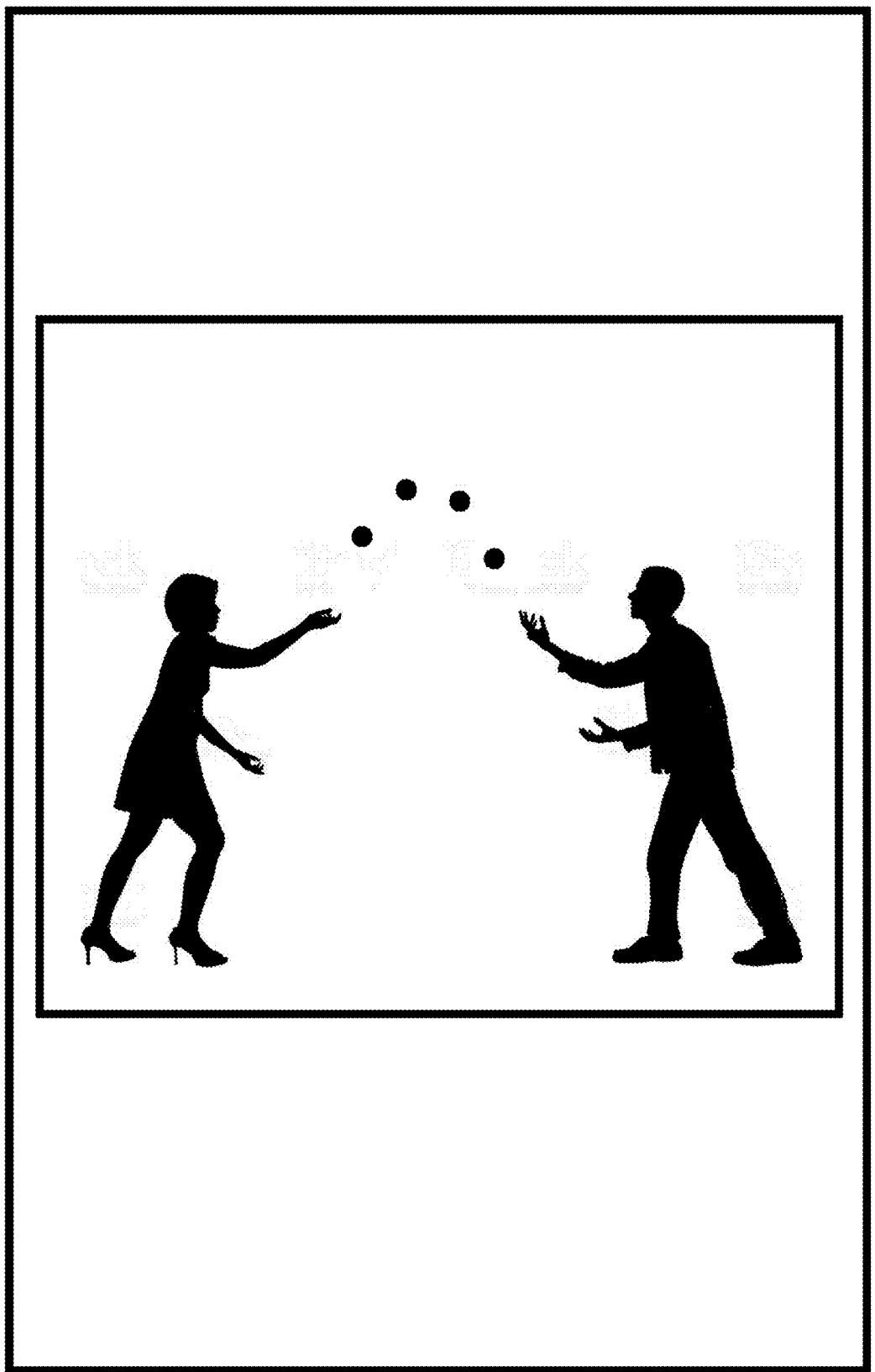
FIG. 2D is an illustration of a screen of a smartphone, held in portrait orientation, playing a video having a content-aware cropped frame, in accordance with some embodiments of the present invention.

Reference is made to FIG. 2D, which is an illustration of a screen 240 of a smartphone, held in portrait orientation, playing a video having a content-aware cropped frame that is based on frame 200 (or, based on frame 220), in accordance with some embodiments of the present invention. As demonstrated, the frame now occupies approximately 50 percent of the entire available screen real estate, and the objects in the frame are twice larger relative to their on-screen size in FIG. 2C, thereby enabling the viewer to notice fine details therein. Furthermore, the non-changing or non-moving object (the tree) was cropped-out in this frame and in the entire video segment, based on content-aware metadata; thereby allowing the viewer to enjoy a larger-size view of the video-portion that contains the visually moving or visually changing objects, and without wasting screen real estate on the non-moving or non-changing object.

In some embodiments, a particular visual object may have a first importance score in a first frame (or, in a first batch-of-frames; or, in a first time-slot of a video), and may subsequently have a second, different, importance score in a second, different, frame (or, in a second, different, batch-of-frames or time-slot) of the same video. For example, in the frame shown in FIG. 2B, each one of the two Human objects has a high importance score, since they are identified to be human and/or moving and/or changing across frames; for example, each one of these two Human objects may have an importance score in the range of 90 to 95 percent as long as they are moving and changing, during the first ten seconds of the video. Then, in the next seven seconds of the video, one of the two Human objects may sit down and stop moving, and only the other Human object continues to move and play with balls; and therefore, the sitting Human may be assigned, in each frame of those seven seconds of the video, a reduced importance score (e.g., 25 or 38 percent), while the standing and moving Human may continue to be assigned the high importance score (e.g., 95 percent) due to his movement and visual changes. Accordingly, the system and method of the present invention may dynamically track an in-frame visual object in a manner that flexibly modifies its level of importance at different time-points or within different time-slots; thereby enabling the end-user device to dynamically make adjustments or modifications to the displayed video in a manner that is tailored to the actual visual changes that are reflected in the content-aware metadata.

In some embodiments, a particular visual object may have a first in-frame size (e.g., in frame width percentage) in a first frame (or, in a first batch-of-frames; or, in a first time-slot of a video), and may subsequently have a second, different, in-frame size in a second, different, frame (or, in a second, different, batch-of-frames or time-slot) of the same video. Additionally or alternatively, a particular visual object may have a first boundaries shape (e.g., circle, or rectangle) in a first frame (or, in a first batch-of-frames; or, in a first time-slot of a video), and may subsequently have a second, different, boundaries shape in a second, different, frame (or, in a second, different, batch-of-frames or time-slot) of the same video. For example, referring again to the frame shown in FIG. 2B, the two Human objects are shown as having two, respective, vertically-elongated rectangular boundaries; in a later frame or batch-of-frames, one of the two Human objects may sit down, and his boundaries may change from a large rectangle to a smaller circle. In another example, a video-segment may perform a "zoom in" effect on a particular region, thereby causing an in-frame identified Object to become larger (e.g., relative to the frame width); and the present invention may thus modify the size of the boundaries of such object. Accordingly, this feature enables the method and system of the present invention to dynamically track, across multiple frames or across different video segments, the same in-frame object in an efficient manner, flexibly taking into account the changes in its size and/or shape of identified objects, rather than allocated a rigid or non-changing shape or size for an identified object.

Reference is made to FIGS. 3A to 3D, which demonstrate content-aware watermarking or overlay positioning of additional content, in accordance with some demonstrative embodiments of the present invention. For example, a device or a program may add an overlay content on the media for one or more reasons (e.g., advertising, copyright indication, logo display, subtitles or captions, or the like), and may selectively choose the in-frame location for the placement of such added content or element(s) based on the content-aware metadata with regard to objects identified in the original frame or image, in order to avoid overlaying on top of a visually important object (or, in some implementation, in order to overlay additional content specifically on top of visually important content for purposes of embedding there a copyright notice or an important watermark, to prevent illegal use of the image or frame or video).

Figure 3A:
FIG. 3A is an illustration of an original frame or image, which may be analyzed to generate content-aware metadata in accordance with the present invention.

For example, FIG. 3A is an illustration of an original frame or image 301, which may be analyzed to generate content-aware metadata in accordance with the present invention. Such analysis may generate metadata indicating that there are shown a primary object of a woman (having an importance score of 95%), holding a secondary object of a flower (having an importance score of 24%).

Figure 3B:
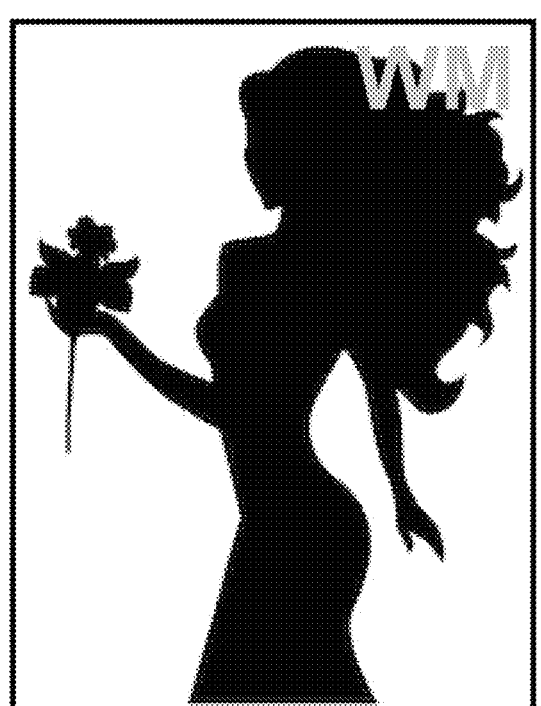
FIG. 3B is an illustration of a frame or image, with an additional content element that was selectively added as a watermark or as an overlay, in accordance with some embodiments of the present invention.

FIG. 3B is an illustration of a frame or image 302, which is a copy of frame or image 301, but with a content element "WM" that was selectively added as a watermark overlay on the object which has the highest visual importance score, in accordance with some embodiments of the present invention.

Figure 3C:
FIG. 3C is an illustration of another frame or image, with a content element added as a watermark, in accordance with some embodiments of the present invention.

FIG. 3C is an illustration of a frame or image 303, which is a copy of frame or image 301, but with a content element "WM" added as a watermark overlay on the object which has the lowest visual importance score, in accordance with some embodiments of the present invention.

Figure 3D:
FIG. 3D is an illustration of a frame or image, with a content element added as a watermark or as overlay, in accordance with some embodiments of the present invention.

FIG. 3D is an illustration of a frame or image 303, which is a copy of frame or image 301, but with a content element "WM" added as a watermark overlay on a frame-portion that lacks any of the two identified objects, in accordance with some embodiments of the present invention.

Some embodiments may utilize the content-aware metadata of the present invention, in order to generate and/or display a summary version of a video clip, or a "trimmed" version of a video clip or a shortened version of a video clip that includes some video-segments that are of a higher importance level and that discard or skip or remove some other video-segments that are of a smaller importance level. For example, a video playback tool or program, or a video editing tool or program, may take into account the content-aware metadata of a given video (e.g., received from a remote server as an accompanying "sidecar" file or being embedded as metadata in the header or in a private channel, or generated locally on the client-side device), for the purpose of summarizing or trimming content, skipping or discarding frames or time-slots, changing some frame groups (e.g., having lower-importance content) to be displayed or play-backed in "fast forward" (FF) mode (e.g., by skipping every other frame, or every Nth frame), by changing some frame groups (e.g., having higher-importance content) to be displayed or play-backed in "slow motion" mode (e.g., by inserting a delay among consecutive frames of such time-slot), to skip or drop or discard or exclude from such summary one or more frames having (e.g., only) low-importance objects, to keep or maintain or include in such summary one or more frames having (e.g., only, or at least) one or more high-importance objects, or the like. In some embodiments, the fast forwarding (FF) may be implemented not necessarily by skipping (or by showing) every Nth frame, as this may cause the viewer to miss some contextually meaningful frames or information; but rater, by performing a content-aware and an importance-aware fast forwarding process, in which a frame is selectively maintained and shown in the fast forward playback if such frame has an Object whose importance score is greater than a pre-defined threshold value, and/or if that frame has Objects whose total importance scores is greater than a pre-defined threshold value, and/or if that frame shows an Object that did not appear in the immediately preceding frame (or, in some implementations, an Object that did not appear in any of the preceding N frames), and/or if that frame shows at least one Object that did not appear so far at all (or, that did not appear in the previous N frame). Other content-aware or importance-aware criteria or conditions may be used to implement such fast forward playback.

In some embodiments, optionally, the tool or device or program may be configured to summarize a video (or, to perform dynamic and content-aware cropping of a video or aspect-ratio adjustment or resizing of a video) in a content-aware manner that is based on particular keywords to be "included" (e.g., in the trimmed summary, or in the cropped-in playback) or to be "excluded". For example, an end-user viewer or developer may configure his playback program or tool, or his video editing program or tool, to perform content-aware trimming (summarizing) or cropping that would "include" in the resulting version any Objects that are associated with keywords such as "man" or "woman" or "human" or "child", and/or that would "exclude" from the resulting version any Objects that are associated with keywords such as "dog" or "animal" or "tree" or "furniture". In some embodiments, the program or tool or device may optionally utilize a pre-defined dictionary or thesaurus or list or data-set of synonyms or based on pre-defined taxonomy data or based on NLP analysis, or a list of all the Objects recognized in the current video as reflected in the metadata list of that video; such that a user's selection of a keyword such as "animal", would also be interpreted and enforced regarding Objects having a keyword of "dog" or "cat" or "bird". The system and method of the present invention may thus enable a user to efficiently obtain, view and/or generate a content-aware summary video clip or a content-aware cropped playback or cropped version, which maintains scenes or objects having Humans and discarding scenes or objects that are Animals or Furniture. In some embodiments, the system or method may generate and/or display a more "balanced" modified or summarized version of the video, collecting and including some frames from various part of the source video in order to include all (or most) of the important objects in such summarized version.

In some embodiments, optionally, the summarization process or unit which summarizes a video segment into a shorter version thereof, may selectively discard a particular frame whose objects have a cumulative visual importance score that is greater than a pre-defined threshold value; for example, if that particular frame is part of a sequence of neighboring frames, and the average per-frame cumulative visual importance score is smaller than or equal to that pre-defined threshold value. For example, a set of Ten consecutive frames may be analyzed; each frame in that sequence has a cumulative visual importance score, and the ten consecutive scores of those eight consecutive frames are: {3, 7, 4, 5, 97, 8, 2, 5, 6, 3}. The system may discard the entirety of this group of Ten consecutive frames, including the fifth frame in this sequence, even though the fifth frame by itself has a high cumulative visual importance score (97) that is greater than a pre-defined threshold value (e.g., greater than 50); because the system determines that the Per-Frame Average cumulative visual importance score if 14 (calculated as 140/10), and that Per-Frame Average (14) is smaller than the threshold value (50) for discarding or keeping frames based on visual importance. In some embodiments, other suitable methods or calculations may be used with regard to a set or subset of frames, or a group of batch of frames, particularly of consecutive or neighboring frames, in order to reach a decision with regard to keeping or discarding the entirety of such group or subset of frames; for example, based on average, median, a weighted average or a weighted formula (e.g., utilizing a coefficient or a factor to provide a greater weight to high-importance frames in the calculation), or the like.

In some embodiments, the meta-data that is generated for a video, and that is later utilized by the playback device or by the content consumption application, may optionally include meta-data which indicates, for example: (i) one or more visual objects and/or frame regions, and (ii) an action that should be performed by the playback device if that visual object or frame region is engaged by the end-user during playback of that video. Engagement by the user may include, for example, a click, a double-click, a tap, a double-tap, a hover (e.g., mouse hover, on-screen pointer hover), or the like. The action taken in response to that engagement may be, for example: opening a new window or a new tab which accesses a particular URL or URI; launching a browser application which accesses a particular URL or URI; accessing a web-page or a web-site or opening a window or a tab or a pop-up which shows data related to the visual object of frame-region that the user selected or engaged (e.g., product price, product dimensions, product size(s), product condition, product ratings, product reviews, or the like). In some embodiments, the meta-data may define that upon engagement with that frame-region or visual object, the playback of the video will be automatically modified based on a pre-defined modification scheme that is indicated in the meta-data; for example, the video meta-data indicating that a click or a tap of the user on Object 1 at the 24th second of the video, would cause: (i) skipping the video 10 seconds forward to continue playback from the 34th second of the video, or (ii) causing the playback speed of the video to be increased (or decreased) by a pre-defined factor, or (iii) cause the playback of this video to be stopped and replaced with a playback of another particular video, or the like. In some embodiments, optionally, the meta-data may further indicate to the playback device, that a particular visual object or frame-region should be emphasized in a particular manner by the playback device, even though such emphasis is not an inherent part of the video content itself; for example, the meta-data for a video of 60 seconds, may include an indication to the playback device, that Object 3, which appears from the 23rd second until the 31st second of the video, should be emphasized visually by adding a yellow border around it, or by increasing its brightness level by 50%, or by increasing its color saturation by 60%, or the like; and the playback application processes such meta-data and performs the required operations to create, on its side, the required emphasis or highlighting or other visual modification; which, in turn, may signal to the user that this particular visual object or frame-region is an actionable object that the user can engage with. In some embodiments, the meta-data of the video may indicate to the playback device, to emphasize or highlight in a particular manner, a particular visual object or frame-region within the video, for a particular time-slot or time-window of that video; and the playback device then proceeds to perform such visual emphasis or highlighting. In other embodiments, the meta-data of the video may indicate to the playback device, to display a textual caption that is part of the meta-data (e.g., "Click on the Frisbee to purchase it"), as an overlay on top of the video and/or in proximity to a particular visual object, or even outside the video frame (e.g., below it or above it), to assist in turning the attention of the user towards the option to engage. In some embodiments, the meta-data for a video may indicate, that Hovering over a first particular object (e.g., with an on-screen pointer of a mouse of touch-pad) would cause the playback device to show, externally to the video or near it, one or more data-items about that first particular object (e.g., based on a URL or URI defined in the meta-data; or based on actual non-changing data which may optionally be included in the meta-data); whereas, Hovering over a second particular object in the same video (and even in the same frame which also includes the first particular object) would cause the playback device to show such data for the second particular object; thereby enabling the user of the playback device to temporarily hover over different visual objects in the video, causing the playback device to display relevant information (based on the meta-data of the video) for each of the objects upon its hovering; whereas, a click or a tap of each object would cause an opening or a launch of a different page (e.g., in a browser) that is defined in the meta-data as associated with each such visual object.

Figure 4:
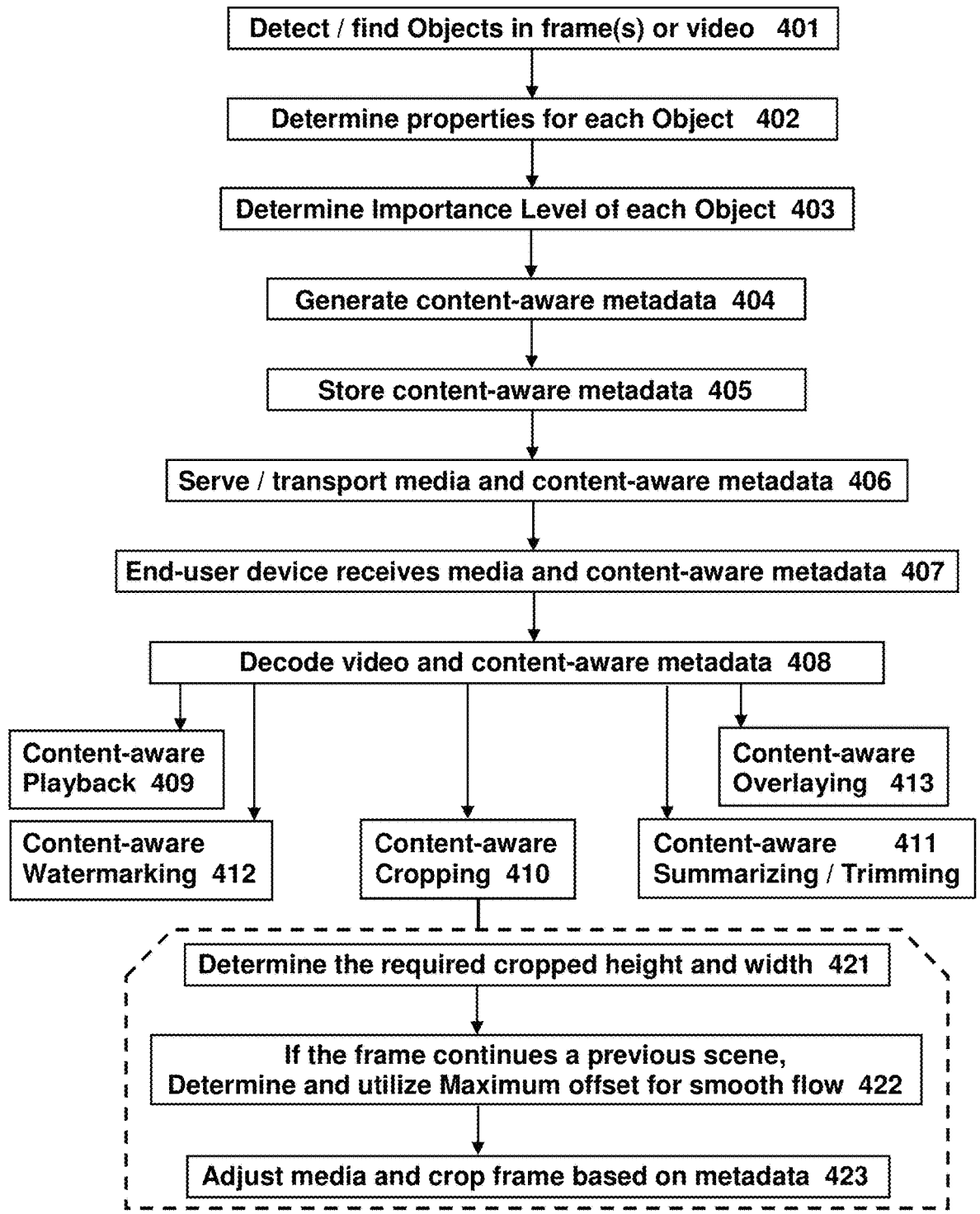
FIG. 4 is a flow-chart of a method, in accordance with some demonstrative embodiments of the present invention.

Reference is made to FIG. 4, which is a flow-chart of a method, in accordance with some demonstrative embodiments of the present invention. The operations of blocks 401-406 of the method may be part of a content-aware Media Generation or Media Creation process or program or tool; whereas, the operations of blocks 407 and onward of the method may be part of a content-aware Media Consumption or Media Utilization or Media Usage or Media Playback process or tool or program.

In some embodiments, the Media Generation operations of blocks 401-406 may be performed at, or by, a media authoring or media capturing or media generating entity or device or server; or by a server or device of a Content Delivery Network (CDN) or by a content distribution server or network element or repository; whereas, in other embodiments, the Media Generation operations of blocks 401-406 may be performed on an end-user device, such as, on a desktop computer or a laptop computer that are utilized for video editing or video authoring, or even (in some implementations) on a mobile device (e.g., smartphone, tablet) that may be utilized for both capturing of video content and editing or authoring or sharing a video file or a video stream from such video content.

In some embodiments, the operations of blocks 407 and onward, may be performed by an end-user device, or by a content consumption device or program or tool, or by a content playback device or program or tool. In other embodiments, the operations of blocks 407 and onward, may be performed by a video editing or video conversion tool or program or device, or by a web browser that displays or plays content, or by a plug-in or add-on or extension module to a web browser or to a video playback or content consumption program or "app".

As demonstrated, the method may begin (block 401) by detecting or finding Objects in a video or in a content-item, or in a frame or in frames of a video or content-items; and by determining (block 402), for each such identified Object, its relevant content-aware properties, for example, its in-frame location or position, size, boundaries, object type or object name or object keyword(s); and by allocating or assigning or determining (block 403), for each such Object, an Importance Score or a Visual Importance Score or an Importance Level or a Visual Importance Level. The operations of blocks 401-403 may be performed manually by a human; or automatically by a program or device that performs a computerized vision process or a computerized image recognition process or a computerized image analysis process or object saliency process; or semi-automatically (e.g., a computerized tool performs a computer vision analysis, and proposes Objects for approval or rejection by a human inspector).

The method proceeds to generate (block 404) content-aware metadata or information, which corresponds or which represents the data that was determined in the previous steps. The content-aware metadata is then stored (block 405) in a suitable format and/or as a suitable data-item or as a set of data-items; for example, by storing the content-aware metadata within a header (or an addendum) to a media file, or by storing the content-aware metadata in a private channel of the media file, or by storing the content-aware metadata in an accompanying file or an accompanying "sidecar" file or data-item that accompanies the media file. In some embodiments, optionally, the full metadata may be sored as a record or a field in a remote database (or in a local database); and the media file may be modified to store, or to embed therein, only a link or hyperlink or pointer or URL or URI which point to the location (local or remote) in which the full metadata is stored and from which the full metadata may be obtained or downloaded or read or otherwise accessed or fetched.

The media file, with its integrated content-aware metadata, or with the accompanying content-aware metadata file or data-item, may be delivered or transported or transferred or served (block 406); for example, to an end-user device of a user, a developer, a viewer, or the like. Such transport or deliver may be direct (e.g., point to point), or may be indirect (e.g., via a Content Deliver Network (CDN) or via a content distribution network, optionally traversing multiple network elements or nodes or routers or switches or hubs until reaching the end-user device).

The end-user device receives (block 407) the media file and the accompanying or integrated content-aware metadata; and may decode the video content (or other image or visual content) as well as the content-aware metadata (block 408).

The end-user device proceeds to perform one or more content-aware modifications or adjustment to the media, and/or to perform playback or displaying of the media in a content-aware modified manner (block 409); for example, by performing content-aware cropping (block 410), or content-aware summarizing/trimming (block 411), or content-aware watermarking (block 412), or content-aware overlaying of additional content (block 413), or other content-aware operations. In some embodiments, optionally, one or more of the Objects may be click-able or tap-able or selectable; such that while the video content is played, the user is indicated via a visible symbol or cue or indicator (which may be external to the video or near the video, or may be an overlay of an indicator on the played video) to click or tap or select an Object in the video. Once clicked on or tapped or selected, the content consumption application or device may perform one or more operations or actions, which may be pre-indicated in the metadata list of that content; for example, to open or launch a new web page for a particular URL, and/or to display side information (e.g., product details, product name, product price, user rating, available sizes, or the like), to skip to another part or portion of the video file, to switch to playing a different video file, to cause sharing of a particular frame or Object with third parties or with a content sharing platform, or the like. The content-aware metadata may be used by the playback device or application to locate the relevant Objects in the video, and/or for dynamically determining where to place or display the visible cue or indicator for clicking or tapping, and/or where to define and operate the click responsive area or the tap responsive area for that specific object.

For demonstrative purposes, the step of performing content-aware cropping (block 410) is further demonstrated in the flow-chart. For example, this operation may include, calculating or determining (block 421) the required cropped width and cropped height, that would fit the currently-available display size or display resolution; checking whether the frame that is intended to be displayed, visually continues a same scene that was already depicted in the immediately preceding frame, and if the check result is positive, then determining and utilizing an offset or a maximum offset (e.g., in frame width percentage, or in pixels) that should be used relative to the previous frame to ensure maintaining of a visually smooth flow or playback (block 422); and then, adjusting the media (block 423) to the available display size or resolution by performing a content-aware cropping of the frame which takes into account the identified Objects, their in-frame location or position, their sizes, their shapes, and their assigned Importance Levels or Importance Scores, and optionally also takes into account the maximum offset that was determined in order to achieve a smooth flow or a smooth playback that lacks abrupt changes or abrupt "jumps" of a visual object relative to previous frame(s) (e.g., to avoid a result in which a particular object, such as the Dog object, appears on the right-most third of the screen in a first cropped frame, and then abruptly appears on the left-most third of the screen in the next consecutive frame).

Figure 5A:
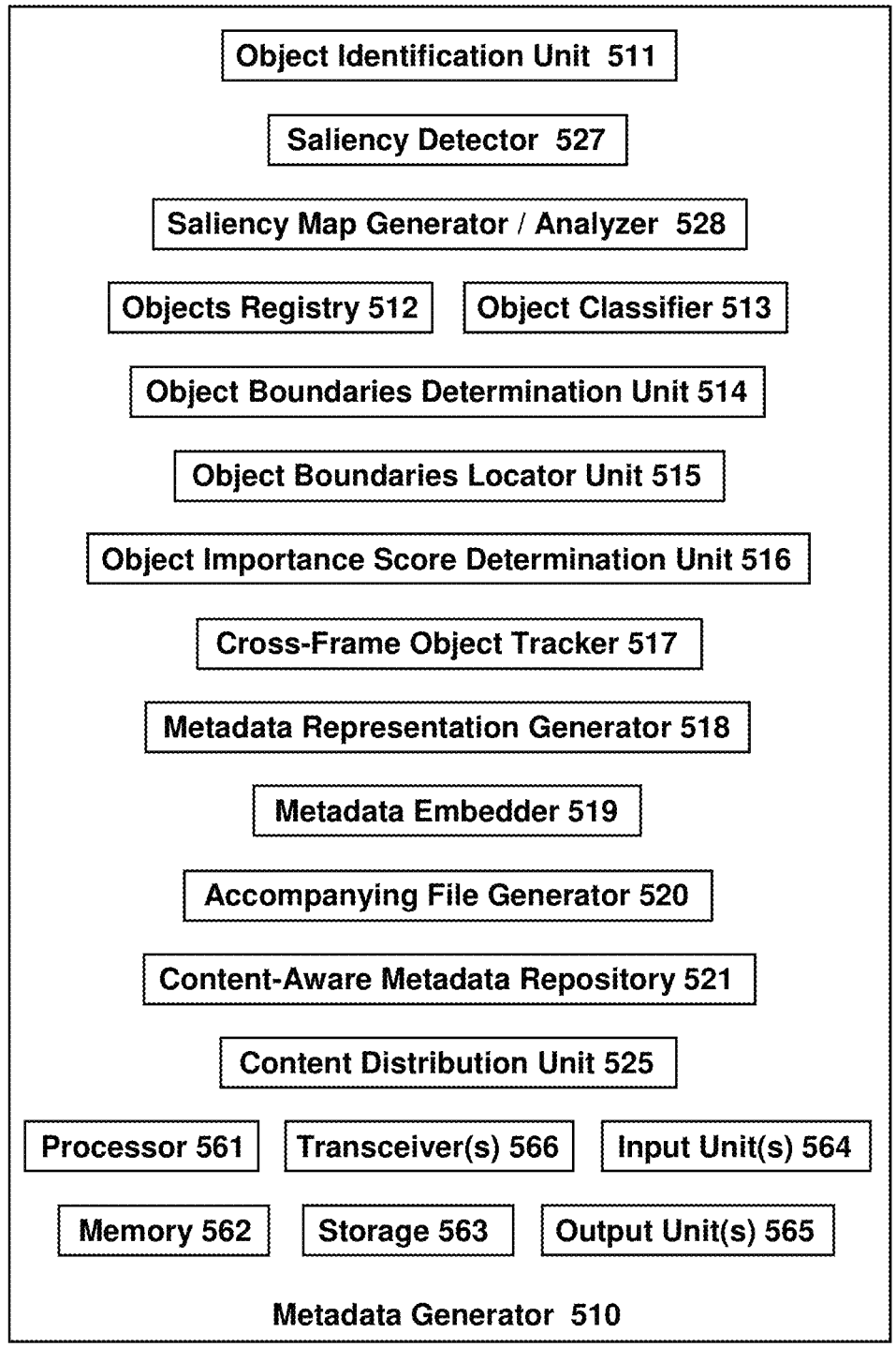
FIG. 5A is a schematic block-diagram illustration of a Metadata Generator, in accordance with some embodiments of the present invention.
Figure 5B:
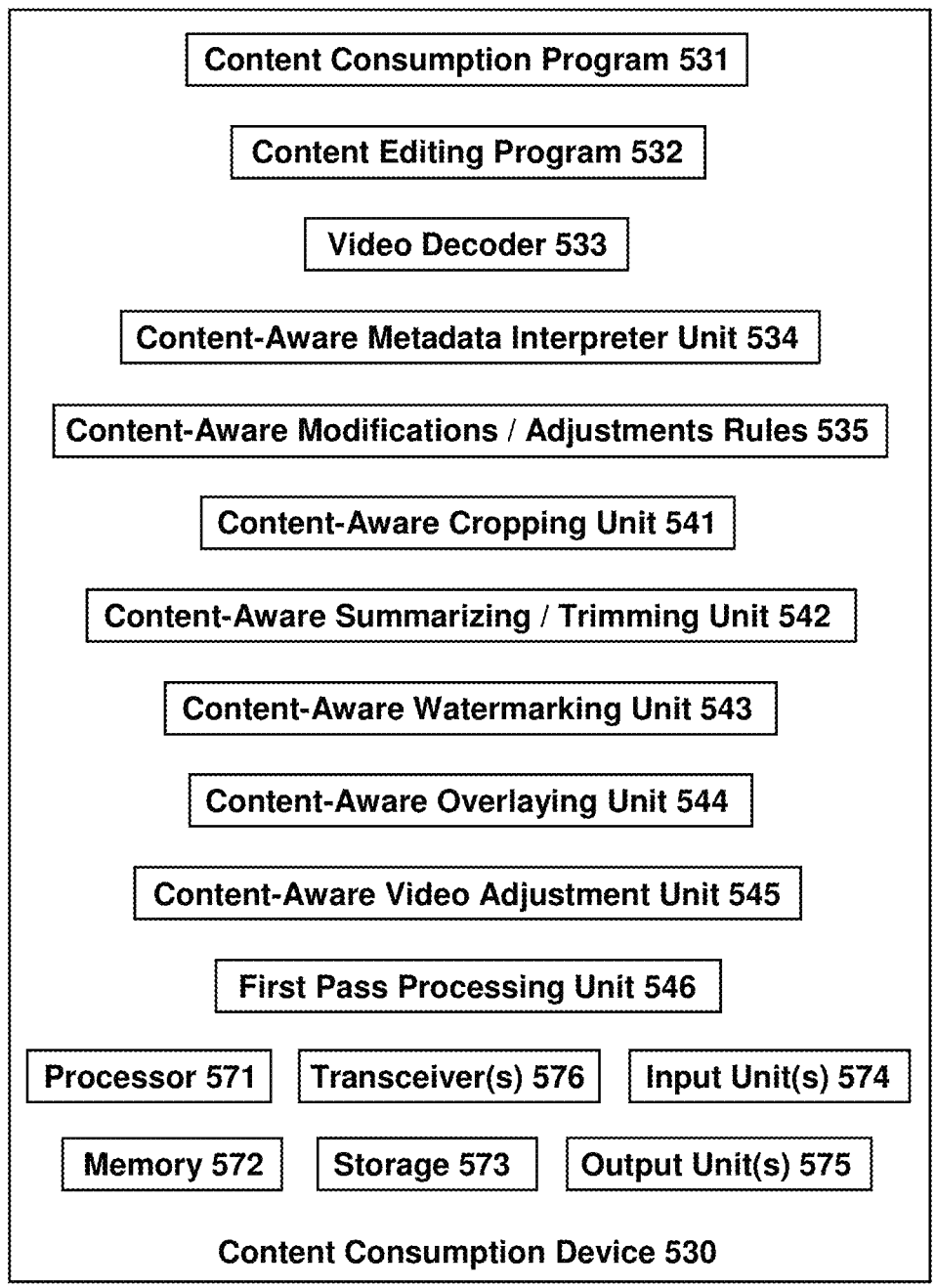
FIG. 5B is a schematic block-diagram illustration of a Content Consumption Device, in accordance with some embodiments of the present invention.

Reference is made to FIGS. 5A and 5B, which are schematic block-diagram illustrations of a Metadata Generator 510 and of a Content Consumption Device 530, respectively, in accordance with some embodiments of the present invention. Both of these devices or units may be parts of a single or unified system; for demonstrative purposes, and to avoid over-crowding of a single drawing page with numerous components, these two devices are shown in two separate figures (FIGS. 5A and 5B), although they may be in communication with each other, directly or indirectly.

For example, a media file is received (or is authored, or captured, or generated) by a Metadata Generator 510, which generates and adds to it content-aware metadata; the media file and the accompanying or embedded content-aware metadata is then utilized by a content consumption device or tool or program, which dynamically performs one or more content-aware adjustments to the playback or the display or the consumption manner of the media file, based on the content-aware metadata.

Metadata Generator 510 may comprise an Object Identification Unit 511, able to analyze one or more frames of the video (or other media content) and able to identify or classify therein one or more visually-depicted Objects. Optionally, the Object Identification Unit 511 may be implemented as, or may include, or may be associated with, a Saliency Detector 527 and/or a Saliency Map Generator/Analyzer 528, which may utilize a suitable saliency detection algorithm to generate a saliency map that pertains to a frame of the video and that topographically maps the visual elements or objects therein, or indicating the conspicuity or saliency or salience (e.g., the state or quality by which an object stands out from its neighbors or surrounding or environment or background or nearby objects or other objects) of discrete objects or elements in a frame, or indicating numerically or quantitatively one or more frame-regions based on the spatial distribution of saliency. Optionally, a neural network (NN) or a convolutional neural network (CNN) may be used, and/or a suitable computer vision algorithm or model, and/or a suitable machine learning (ML) or deep learning (DL) or artificial intelligence (AI) algorithm or process, may be used for such saliency detection and/or saliency mapping and/or saliency feature extraction and/or saliency analysis. Such algorithms may be based on a pre-defined model or framework, and/or may utilize a training data-set and/or pixel clustering rules or classifiers; may be applied to an original frame or to a modified version of a frame (e.g., a greyscale version of the original video frame); may take into account pixel properties, pixel color, pixel contrast, pixel intensity, and/or other features; may optionally utilize a gradient-based approach for saliency mapping or detection; may optionally utilize a comparison process which compares a set or a cluster of pixels to known objects from a data-set or a training database; may optionally utilize one or more processes for reducing or discarding or ignoring noise or artifacts; and/or may utilize other operations to achieve saliency detection, mapping and/or analysis.

An Objects Registry 512 keeps track of the identified Objects across frames of the same video; and each identified Object is assigned a unique Object ID number (or string) which enables to track the same Object across multiple frames. An Object Classifier 513 classifies each Object into one or more classes or object-types, and/or associates each Object with one or more keywords (e.g., "animal" and "dog" for Object 1; "human" and "woman" for Object 2). An Object Boundaries Determination Unit 514 determines the shape (e.g., rectangle, circle, polygon) that would be suitable or efficient for defining the boundaries of each Object, and further determines the size or dimensions of such boundaries (e.g., height and width of a rectangle; radius of a circle). An Object Boundaries Locator Unit 515 determines or defines or assigns the coordinates or other representations that point to the in-frame position or location of each Object; for example, indicated by a horizontal offset from the left edge of the frame (e.g., using a percentage value relative to the total width of the frame) and by a vertical offset from the top edge of the frame (e.g., using percentage value relative to the total height of the frame).

An Object Importance Score Determination Unit 516 determines or assigns an Object Importance Score value, or an object importance level, to each Object; for example, on a scale of 0 to 100, wherein a greater value indicates a greater visual importance and/or contextual importance of the Object from the point-of-view of a human observer. In some embodiments, the Object Importance Score may be determined by taking into account one or more suitable data-items, for example: (a) the total number of Objects that were identified in the current frame (e.g., a single identified Object in a particular frame may be assigned a high Importance Score; whereas an Object that is one out of 14 Objects in a single frame may be assigned a lower Importance Score); (b) the total number of Objects that were identified so far in this video file (e.g., in previous frames); (c) whether or not the particular Object is moving, or is changing its in-frame position, from frame to frame (e.g., increasing the Importance Score for a moving object; decreasing the importance score for a non-moving object); (d) whether or not the particular Object is changing its visual appearance across frames (e.g., increasing the Importance Score of the object Human-1 since that object depicts a person who facial expression changed from happy to sad across frames; decreasing the Importance Score of the object Human-2 since that object depicts another person whose facial expression remains fixed across all frames); (e) optionally, taking into account one or more pre-defined prioritization rules or importance setting rules (e.g., an optional rule that assigns a greater Importance Score to human objects relative to animal objects, or to young humans relative to adult humans, or to animal objects relative to non-living objects); (f) optionally, taking into account the size and/or the color of an Object as factors that may affect its Importance Score (e.g., some implementations may determine that an Object having very small dimensions would be assigned a lower Importance Score; some implementations may assign a higher Importance Score to an Object having a highly visible color contrast relative to its background, such as a black ball on a white background); and/or by applying other or additional suitable rules or criteria or conditions.

Optionally, a Cross-Frame Object Tracker 517 may track the same Object across multiple frames, and may adjust or modify the Object's importance score in some (or all) of those frames, and/or may determine a unified cluster or batch of frames that pertain to the same Object and that may be unified into a single metadata record.

A Metadata Representation Generator 518 generates the actual metadata in accordance with a suitable format; optionally, allowing a user or developer or administrator of the Metadata Generator 510 to indicate which format of metadata to utilize. In some implementations, a Metadata Embedder 519 may embed or inject or add or append or otherwise integrate the metadata into the media file itself (e.g., as a private channel, or as part of the header of the video file). In other implementations, an Accompanying File Generator 520 may generate an accompanying file or a "sidecar" file having the metadata (e.g., having the same file-name as the video file, but a different extension). In some implementations, optionally, the metadata may be stored as a record in a Content-Aware Metadata Repository 521, wherein the particular record is associated with a particular video file (or media file); and a permanent link or URL or URI that points to that record may be inserted or embedded into the media file. Other methods may be used for storing the generated content-aware metadata.

A Content Distribution Unit 525 may then distribute, share, server, or otherwise transfer or transport the media file and its content-aware metadata (e.g., integrated or embedded therein, or as an accompanying or "sidecar" file) to a Content Consumption Device 530. There, a Content Consumption Program 531 may utilize the content-aware metadata in order to dynamically perform adjustments or modifications to the manner in which the video file is displayed or consumed or presented to a viewer. Additionally or alternatively, a Content Editing Program 532 may utilize the content-aware metadata in order to modify the video file itself and to generate (e.g., on an end-user device) a content-aware modified version of the video (e.g., a content-aware cropped version, or a content-aware watermarked version, or a content-aware summarized version or trimmed version, or the like).

For example, the Content Consumption Device 530 may comprise a Video Decoder 533, able to decode the video data of the received video file, and able to prepare from it a set of frames that are intended for display on a screen of the Content Consumption Device 530. A Content-Aware Metadata Interpreter Unit 534 may extract and/or obtain the content-aware metadata (e.g., from the accompanying "sidecar" file, or from a private channel within the video file, or from a header or other file-portion of the video file; or optionally, after firstly obtaining the metadata by accessing a record in a remote server based on a URL or URI or other pointer which may be embedded in the video file), and may perform the metadata interpretation from the format in which it was stored to another format (if needed) that the Content Consumption Device 530 is able to process or utilize. For example, the Content-Aware Metadata Interpreter Unit 534 may be a stand-alone unit or module in the Content Consumption Device 530, or may be part of the Content Consumption Program 531 (or of the Content Editing Program 532), and may convert the raw content-aware metadata that was received or extracted, to a set of indicators or commands or parameters that such program may process.

In a demonstrative implementation, for example, the raw metadata that was transported with or within the video file, may enable the Content-Aware Metadata Interpreter Unit 534 to generate a local set of commands, such as: (a) if the device orientation is Portrait, then, in the first 120 frames of the video, crop the video to show only the left-most Half of each frame; and then, (b) in the next 90 frames of the video, crop the video to show only the left-most Third of each frame; and then, (c) in the next 150 frames of the video, crop the video to show only the central 60% of the width of each frame; and then, (d) in the next 180 frames, crop the video to show only the right-most Third of each frame; and so forth. In some embodiments, the content-aware cropping or the importance-aware cropping is performed by ensuring a smooth transition among frames and video-segments, and/or to avoid or prevent or cure any abrupt "jumps" of an Object from one screen-portion to another screen-portion. For example, the required display area may operate to adjust the content by selecting and keeping (cropping-in) the most important Object(s), and by discarding or cropping-out the other Object(s) and/or the surrounding environment, while also utilizing a fitter algorithm to generate smooth motion between frames and to prevent "jumpy" playback.

In another demonstrative implementation, for example, the raw metadata that was transported with or within the video file, may enable the Content-Aware Metadata Interpreter Unit 534 to generate a local set of commands, such as: (a) in the first 150 frames of the video, place a or overlay the watermark "Logo.png" at the top-right corner of each frame; and then, (b) in the next 120 frames of the video, place or overlay said watermark at the bottom-left corner of each frame; and so forth.

In another demonstrative implementation, for example, the raw metadata that was transported with or within the video file, may enable the Content-Aware Metadata Interpreter Unit 534 to generate a local set of commands, such as: (a) in the first 180 frames of the video, place a or overlay Subtitles Text from at the bottom one-quarter of each frame; and then, (b) in the next 150 frames of the video, place or overlay Subtitles Text at the top one-quarter of each frame; and so forth.

In another demonstrative implementation, for example, the raw metadata that was transported with or within the video file, may enable the Content-Aware Metadata Interpreter Unit 534 to generate a local set of commands, such as: for summarizing purposes, or for creating or displaying a summarized version or a trimmed version of the video, (a) in the first 180 frames of the video, discard from such summary any frame that lacks at least one Object having an Importance Score of at least 90 percent, and then, (b) in the next 150 frames of the video, discard from such summary any frame whose Objects, in the aggregate, do not have a cumulative Importance Score of at least 80 percent; and so forth. Such modifications or adjustments of the video and/or its playback, may be performed based on the content-aware metadata by enforcing or applying one or more Content-Aware Modifications/Adjustments Rules 535, which may be pre-defined and/or may be user configurable.

The above-mentioned content-aware or content-based commands, for displaying and/or adjusting and/or modifying and/or editing the video file (or other content file), may be performed by the relevant program or unit in the Content Consumption Device 530. For example, a Content-Aware Cropping Unit 541 may perform the content-aware cropping of the video, based directly on the raw content-aware metadata, or based on the set of local commands or indicators as generated by the Content-Aware Metadata Interpreter Unit 534, and/or based on the Content-Aware Modifications/Adjustments Rules 535. In a demonstrative implementation, content-aware cropping may be performed by applying (for example) one or more of the following rules: (I) if the currently-processed frame includes exactly one object having an Importance Score that is greater than 90%, and includes no other objects, then crop the frame to include that single object plus a width margin of additional 10% to the right and additional 10% to the left; (II) if the above would cause the object to visually "jump" abruptly by more than 3% of the frame width, relative to the immediately-previous cropped frame, then crop the current frame differently by modifying the additional width margin(s) around it to ensure not more than 3% abrupt jump of that object along the width of the frame; (III) if the currently-processed frame includes two Objects having (each one of them) an Importance Score of 80% or more, and also includes one or more other Objects having (each one of them) an Importance Score smaller than 80 percent, then crop the current frame to include these two Objects and a width margin of 5% on each side (right and left); (IV) if the currently-processed frame includes an Object having an Importance Score of at least 75%, and that Object is associated with the metadata name or metadata keyword "man" or "woman" or "human", then crop the frame around the boundaries of this Object with a margin of additional 5% from each side; and so forth. These are only non-limiting examples of demonstrative rules; and other suitable rules or conditions may be used.

Additionally or alternatively, a Content-Aware Summarizing/Trimming Unit 542 may perform the content-aware summarizing or trimming of the video, based directly on the raw content-aware metadata, or based on the set of local commands or indicators as generated by the Content-Aware Metadata Interpreter Unit 534, and/or based on the Content-Aware Modifications/Adjustments Rules 535. In a demonstrative implementation, content-aware summarizing (or trimming, or timewise shortening) may be performed by applying (for example) one or more of the following rules: (I) if the currently-processed frame has no Object whose Importance Score is greater than 50%, then discard this frame and exclude it from the summary video playback; (II) if the currently-processed frame has two or more Objects, whose aggregate or cumulative Importance Score is below 60%, then discard this frame and exclude it from the summary video playback; (III) if the currently-processed frame has at least one Object, whose Importance Score is at least 85%, then include this frame in the summary video playback; (IV) if the same Object appears in 30 consecutive frames, and in each one of them it has an Importance Score of at least 90%, then include in the summary every third frame from this sequence of 30 frames, and discard the remaining frames rom this sequence; and so forth. These are only non-limiting examples of demonstrative rules; and other suitable rules or conditions may be used.

Additionally or alternatively, a Content-Aware Watermarking Unit 543 may perform the content-aware placement or embedding of a watermark or a logo or a caption in the video, based directly on the raw content-aware metadata, or based on the set of local commands or indicators as generated by the Content-Aware Metadata Interpreter Unit 534, and/or based on the Content-Aware Modifications/Adjustments Rules 535. In a demonstrative implementation, content-aware watermarking may be performed by applying (for example) one or more of the following rules: (I) if the playback program or the content consumption program is configured to place a watermark on High Importance objects, then, place a pre-defined watermark onto objects in the current frame having (each one separately) an Importance Score of at least 80%; (II) if the playback program or the content consumption program is configured to place a watermark on Low Importance objects, then, place a pre-defined watermark onto objects in the current frame having (each one separately) an Importance Score that is smaller than 25%; (III) place the watermark onto any object whose content-aware metadata keyword or metadata name is "animal" or "dog" or "cat"; and so forth. These are only non-limiting examples of demonstrative rules; and other suitable rules or conditions may be used.

Additionally or alternatively, a Content-Aware Overlaying Unit 544 may perform the content-aware overlaying of other content-element(s) which may be visually added to the video, based directly on the raw content-aware metadata, or based on the set of local commands or indicators as generated by the Content-Aware Metadata Interpreter Unit 534 and/or based on the Content-Aware Modifications/Adjustments Rules 535. In a demonstrative implementation, content-aware overlaying of additional content-elements may be performed by applying (for example) one or more of the following rules: rules: (I) if the content-element that needs to be overlaid is a subtitles string, then place it at the lower quarter of the frame if that lower quarter is not occupied by any Object whose Importance Score is at least 90%; (II) if the content-element that needs to be overlaid is a graphical (non-textual) content-element, then place it at the top-left corner of the frame if that region is not occupied by any Object whose Importance Score is at least 80%; (III) if Rule (II) did not allow placement at the top-left corner of the frame, then apply same rule to the bottom-right corner of the frame; (IV) place a content-element on a frame-region that is not occupied by an Object that is associated with metadata name or keyword of "human" or "woman" or "man"; and so forth. These are only non-limiting examples of demonstrative rules; and other suitable rules or conditions may be used.

Additionally or alternatively, a Content-Aware Video Adjustment Unit 545 may perform other suitable content-aware modifications or adjustment, to the video and/or to the manner in which it is displayed; for example, rotating the video, modifying the aspect ratio of the video, re-sizing the video, discarding frame-portions or frame-regions, discarding or hiding particular frames or frame-regions, slowing-down or speeding-up the playback speed of the video (e.g., by selectively dropping or skipping particular low-importance frames based on content-aware considerations, or by selectively injecting or adding a slight delay or wait-period between particular high-importance frames based on content-aware considerations), selectively modifying the playback speed of particular frames or video-segments, modifying the color or the contrast or the font or other properties of a logo or a watermark or a caption or an image element that is intended to be overlaid on the video (e.g., selectively using a black watermark to overlay a High Importance object that is yellow; and selectively using a white watermark to overlay another High Importance object that is dark blue; in the same video, or even in the same single frame); or other suitable adjustments or modifications, which may be performed, for example, based directly on the raw content-aware metadata, and/or based on the set of local commands or indicators as generated by the Content-Aware Metadata Interpreter Unit 534, and/or based on the Content-Aware Modifications/Adjustments Rules 535. In a demonstrative implementation, such content-aware modifications or adjustments may be performed by applying (for example) one or more of the following rules: (I) if the video playback program is configured (e.g., by the end-user, or by a provider of such program) to speed-up non-important video segments, then, skip every-other-frame in a sequence of 10 or more frames in which the aggregate Importance Score of all objects in each such frame is smaller than 50% in the aggregate; (II) if the video playback program is configured (e.g., by the end-user, or by a provider of such program) to slow-down the playback of high-importance video-segments, then, add a delay of N milliseconds between frames in a frame-sequence of 30 frames in which each frame has at least three Objects that have (each Object by itself) an Importance Score of at least 90%; (III) increase by 50% the Contrast or the Intensity of each Object having an Importance Score that is over 94%; and so forth. These are only non-limiting examples of demonstrative rules; and other suitable rules or conditions may be used.

In some embodiments, optionally, a First Pass Processing Unit 546 may operate to perform an initial pass on the video, and may prepare a modified or an adjusted content-aware version thereof; which may be cached or stored temporarily within the Content Consumption Device 530, in order to ensure smooth and lag-free playback of the already-modified or already-adjusted version of the video, and/or in order to offload some of the processing operations from the playback program to a separate thread or process, and/or in order to allow such initial pass to be performed (optionally) while the Content Consumption Device 530 is idle or is less occupied with other tasks (e.g., allowing such initial pass to be performed "in the background" by the Content Consumption Device 530 while the user is reading an email message and prior to the user requesting his device to playback an attached video file). It is noted that such "initial pass" or "first path" is optional, and some implementations may not need it; particularly if the end-user device has sufficient processing power and available memory to allow dynamic, real-time or near-real-time adjustments or modifications to the video, immediately prior to displaying a frame or a set of frames.

In some embodiments, in order to perform the computerized operations described above, the relevant system or devices may be equipped with suitable hardware components and/or software components. For example, Metadata Generator 510 may comprise: a processor 561 able to process data and/or execute code or machine-readable instructions (e.g., a central processing unit (CPU), a graphic processing unit (GPU), a digital signal processor (DSP), a processing core, an Integrated Circuit (IC), an Application- Specific IC (ASIC), one or more controllers, a logic unit, or the like); a memory unit 562 able to store data for short term (e.g., Random Access Memory (RAM), volatile memory); a storage unit 563 able to store data for long term (e.g., non-volatile memory, Flash memory, hard disk drive, solid state drive, optical drive); an input unit 564 able to receive user's input (e.g., keyboard, keypad, mouse, touch-pad, touch-screen, trackball, microphone); an output unit 565 able to generate or produce or provide output (e.g., screen, touch-screen, monitor, display unit, audio speakers); one or more transceivers 566 or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like).

Similarly, Content Consumption Device 530 may comprise: a processor 571 able to process data and/or execute code or machine-readable instructions (e.g., a central processing unit (CPU), a graphic processing unit (GPU), a digital signal processor (DSP), a processing core, an Integrated Circuit (IC), an Application-Specific IC (ASIC), one or more controllers, a logic unit, or the like); a memory unit 572 able to store data for short term (e.g., Random Access Memory (RAM), volatile memory); a storage unit 573 able to store data for long term (e.g., non-volatile memory, Flash memory, hard disk drive, solid state drive, optical drive); an input unit 574 able to receive user's input (e.g., keyboard, keypad, mouse, touch-pad, touch-screen, trackball, microphone); an output unit 575 able to generate or produce or provide output (e.g., screen, touch-screen, monitor, display unit, audio speakers); one or more transceivers 576 or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like).

For demonstrative purposes, some portions of the discussion above or herein may relate to content-aware modifications or adjustments of a video file; however, this is only a non-limiting example, and some embodiments of the present invention may similarly operated to perform content-aware modifications or adjustments of other types of content, for example, an image, a photograph, a set or batch or gallery of images or photographs, a bitmap graphics file, a vector graphics file, an animation sequence (e.g., Animated GIF), a cinemagraph or cinema-graph item (e.g., having subtle or visually-subtle animation therein), a rich media file, or the like.

Some embodiments may be utilized to enable modification or adjustments of, for example, a video, an audio-video, a video file, an audio-video file, a video segment, a video stream, and audio-video stream, a multimedia content that may include graphics and/or motion and/or video and/or sound and/or animation, a non-static multimedia item (e.g., having at least two frames that are at least partially different from each other), an advertisement or an ad, a file or a stream of bits or bytes that represents or that carry video content, a video-only or visual-only multimedia item that lacks audio or a silent video (e.g., represented as a GIF or an Animated GIF file or item), a video file or a streaming video that is encoded and/or compressed and/or represented using one or more suitable video codecs (e.g., AVC codec or H.264; or HEVC codec or H.265; or the like) and/or stored or contained in a suitable container or file format (e.g., MP4, or MOV, or AVI, or MKV, or WebM, or a container for VP8 or VP9 or AV1 video, or the like), an animation or a dynamic presentation that is represented using bitmap graphics and/or vector graphics and/or textual elements and/or a program script (e.g., JavaScript, HTML5, CSS, or the like) that causes motion and/or animation or content modification, a dynamic or non-static content-item in which at least a portion of the content-item is modified or replaced (e.g., automatically, or autonomously; or at a particular time-point; or in response to user engagement such as hovering or clicking or tapping), a banner ad, a pre-roll or mid-roll or post-roll video or multimedia advertisement, a linear video or multimedia ad (e.g., that is displayed before or after or during a feature video), a non-linear or a concurrent video or multimedia ad (e.g., that is displayed concurrently while the feature video is played, such as in proximity to it or in another tab or another window or another on-screen area), a post-roll video or multimedia advertisement, a rich media content-item or ad, a companion ad that wraps around or is located adjacent to a feature movie or video; a video that is embedded in, or shown by or in, or served by or in, a social network or a social media website or a social media application or "app"; or the like.

Some embodiments may include a method (e.g., an electronic method, a computerized method, an automated method, an automatic method) comprising: (a) receiving a video file, and receiving content-aware metadata about visual objects that are depicted by said video file; (b) dynamically adjusting playback of said video file, on a video playback device, based cumulatively on at least (I) said content-aware metadata, and (II) dimensions of a screen-portion that is currently available for playback of said video file on said video playback device.

In some embodiments, step (a) comprises: receiving a video file which comprises at least (i) a video channel carrying video data, and (ii) a private channel carrying content-aware metadata; wherein both the video channel carrying the video data and the private channel carrying the content-aware metadata are internal components of said video file; wherein step (b) comprises: extracting said content-aware metadata from said private channel of said video file, and dynamically adjusting the playback of the video based on content-aware metadata that was extracted from said private channel of said video file.

In some embodiments, step (a) comprises: receiving said video file which is a first file, and receiving separately a second file which stores therein the content-aware metadata pertaining to said first file; wherein step (b) comprises: extracting said content-aware metadata from said second file, and dynamically adjusting the playback of the video based on content-aware metadata that was extracted from said second file.

In some embodiments, step (a) comprises: receiving a video file which comprises at least (i) a video channel carrying video data, and (ii) a file header carrying content-aware metadata; wherein both the video channel carrying the video data and file header carrying the content-aware metadata are internal components of said video file; wherein step (b) comprises: extracting said content-aware metadata from said file header of said video file, and dynamically adjusting the playback of the video based on content-aware metadata that was extracted from said file header of said video file.

In some embodiments, step (a) comprises: receiving a video file which comprises at least (i) a video channel carrying video data, and (ii) a file-portion storing a link to a location on a remote server which stores content-aware metadata pertaining to that video channel; wherein both the video channel carrying the video data and the file-portion storing said link are internal components of said video file; wherein step (a) further comprises: obtaining from said location on remote server, the content-aware metadata pertaining to that video file, based on said link which is part of said video file; wherein step (b) comprises: dynamically adjusting the playback of the video based on content-aware metadata that was obtained from said location on said remote server.

In some embodiments, step (a) comprises: receiving content-aware metadata which describes, on a per-frame basis, (i) one or more visual objects that are depicted in each frame of the video, and (ii) one or more visual importance scores associated respectively with said one or more visual objects.

In some embodiments, step (a) further comprises: receiving content-aware metadata which further describes, on a per-frame basis, (iii) in-frame boundaries of a shape that confines each of said visual objects.

In some embodiments, step (a) further comprises: receiving content-aware metadata which further describes, on a per-frame basis, (iv) an object name associated with each of said visual objects; wherein each of said visual objects is tracked across multiple frames of said video file based on said object name.

In some embodiments, step (b) comprises: dynamically adjusting an aspect ratio of playback of said video file on said video playback device, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

In some embodiments, step (b) comprises: dynamically and selectively cropping frames of said video file during playback of said video file on said video playback device, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

In some embodiments, step (b) comprises: selectively cropping frames of said video file prior to playback of said video file on said video playback device, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

In some embodiments, wherein step (b) comprises: selectively cropping frames of said video file prior to or during playback of said video file on said video playback device, by: (I) determining that a particular frame depicts a first visual object that is associated with a first visual importance score; (II) determining that said particular frame also depicts a second, different, visual object that is associated with a second, smaller, visual importance score; (III) dynamically cropping said particular frame into a cropped-frame which includes therein said first visual object and which excludes said second visual object.

In some embodiments, step (b) comprises: selectively cropping frames of said video file prior to or during playback of said video file on said video playback device, by: (I) determining that a particular frame depicts a first visual object that is associated with a first visual importance score; (II) determining that said particular frame also depicts a second, different, visual object that is associated with a second, smaller, visual importance score; (III) dynamically cropping said particular frame into a cropped-frame which includes therein said first visual object and which excludes said second visual object; wherein the cropping further takes into account a dynamically-determined maximum offset of said first object, between two or more consecutive frames of said video file, to ensure smooth playback of said video without abrupt jumps of said first visual object.

In some embodiments, step (b) comprises: selectively cropping frames of said video file prior to or during playback of said video file on said video playback device, by: (I) determining that a particular frame depicts a first visual object that is associated with a first visual importance score; (II) determining that said particular frame also depicts a second, different, visual object that is associated with a second, smaller, visual importance score; (III) dynamically cropping said particular frame into a cropped-frame which includes therein said first visual object and which excludes said second visual object; wherein the cropping further takes into account tracked in-frame positions of said first object across multiple consecutive frames, to ensure smooth playback of said video without abrupt jumps of said first visual object.

In some embodiments, step (b) comprises: dynamically determining an in-frame location for adding a watermark in each frame of said video file during playback of said video file, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

In some embodiments, step (b) comprises: dynamically determining an in-frame location for overlaying a content-element onto one or more frames of said video file during playback of said video file, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

In some embodiments, step (b) comprises: dynamically generating a summarized version of said video file, by selectively discarding one or more frames of said video file, wherein each frame that is discarded from said video file is a frame that lacks any visual object whose visual importance score is greater than a pre-defined threshold value.

In some embodiments, step (b) comprises: dynamically generating a summarized version of said video file, by selectively discarding one or more frames of said video file, wherein each frame that is discarded from said video file is either: (i) a frame whose objects have, in aggregate, a cumulative visual importance score that is smaller than a pre-defined threshold value, or (ii) a frame whose objects have, in aggregate, a cumulative visual importance score that is equal to or greater than said pre-defined threshold value but said frame is part of a sequence of multiple neighboring frames having an average per-frame cumulative visual importance score that is smaller than said pre-defined threshold value.

In some embodiments, step (b) comprises: dynamically and selectively decreasing a playback speed, of a particular video-segment of said video file, based on content-aware metadata that indicates that said particular video-segment depicts one or more visual objects having an importance score that is greater than a pre-defined threshold value.

In some embodiments, step (b) comprises: dynamically and selectively increasing a playback speed, of a particular video-segment of said video file, based on content-aware metadata that indicates that said particular video-segment depicts one or more visual objects having an importance score that is smaller than a pre-defined threshold value.

In some embodiments, the method comprises: automatically generating and storing a modified version of said video file, which is content-aware cropped relative to said video file.

In some embodiments, the method comprises: automatically generating and displaying a modified version of said video file, which is content-aware cropped relative to said video file.

In some embodiments, the method comprises: automatically generating and storing a modified version of said video file, which is content-aware cropped relative to said video file; wherein at least one frame of said modified version is a frame that was cropped in accordance with a first set of cropping boundaries that are determined based on a first importance score of a first visual object, and wherein at least one other frame of said modified version is a frame that was cropped in accordance with a second, different, set of cropping boundaries that are determined based on a second importance score of a second visual object.

In some embodiments, the method comprises: automatically generating and storing a modified version of said video file, which is a content-aware summary of said video file, by selectively discarding frames from said video file based on said content-aware metadata.

In some embodiments, the method comprises: automatically generating and storing a modified version of said video file, which includes selective and differential watermarking of frames within said video file, by selectively embedding a watermark at different in-frame positions of different frames of said video file, based on said content-aware metadata.

In some embodiments, the method comprises: automatically generating and storing a modified version of said video file, which includes selective and differential overlaying of content-elements into frames of said video file, by selectively overlaying said content-elements at different in-frame positions of different frames of said video file, based on said content-aware metadata.

In some embodiments, the method is performed automatically by a video playback program of an end-user device; wherein the end-user device is a device selected from the group consisting of: a smartphone, a tablet, a smart-watch, a desktop computer, a laptop computer, a gaming device, a Virtual Reality (VR) gear, an Augmented Reality (AR) gear, a smart television.

In some embodiments, the method is performed automatically by a web browser of an end-user device.

In some embodiments, the method is performed automatically by an end-user device that consumes digital video from a social network via a social network website or application.

In some embodiments, the method comprises: based on said content-aware metadata, automatically defining on said video playback device a user-responsive in-screen area, which is displayed within said video, and that when selected or tapped or clicked or mouse-hovered by a user causes said video playback device to perform a specific action that is defined in said content-aware metadata.

In some embodiments, the method comprises: based on said content-aware metadata, automatically defining on said video playback device a user-responsive in-screen area, which is invisible within said video, and that when selected or tapped or clicked by a user causes said video playback device to perform a specific action that is defined in said content-aware metadata.

In some embodiments, the method comprises: during playback of said video on said video playback device, receiving a user selection of a particular screen-portion; determining which visual object is located within said screen-portion; and performing content-aware cropping and playback of said video by selectively cropping-in said visual object.

In some embodiments, the method comprises: during playback of said video on said video playback device, performing content-aware cropping and playback of said video by cropping-in N objects which have a highest importance score out of M objects recognized in said video, wherein N is a positive integer, wherein M is a positive integer, wherein N is smaller than or equal to M.

In some embodiments, the method comprises: (A) extracting from the content-aware metadata of said video file, an indication to visually highlight a particular frame-region of a particular frame in said video; (B) during playback of said video file, performing a visual highlighting of said particular frame-region of said particular frame based on said content-aware metadata.

In some embodiments, the method comprises: (A) extracting from the content-aware metadata of said video file, an indication to open a pre-defined web-page or URL upon user engagement with a particular visual object in a particular frame of said video; (B) during playback of said video file, detecting user engagement with said particular visual object in said particular frame, and automatically opening said pre-defined web-page or URL.

In some embodiments, the method comprises: (A) extracting from the content-aware metadata of said video file, an indication to present particular object-related information upon user engagement with a particular visual object in a particular frame of said video; (B) during playback of said video file, detecting user engagement with said particular visual object in said particular frame, automatically obtaining said particular object-related information, and automatically presenting said particular object-related information in proximity to said video.

In some embodiments, a computerized process comprises: (a) receiving a video file comprising frames; (b) performing saliency detection for objects that are depicted in each frame of said video file; (c) generating an object importance score, for each of said objects in each of said frames; (d) generating content-aware metadata which, at least, (I) defines in-frame location and boundaries for each object, and (ii) indicates the object importance score for each object; (e) generating an association between said video file and said content-aware metadata.

In some embodiments, step (e) comprises: embedding the content-aware metadata into a private channel in said video file.

In some embodiments, step (e) comprises: embedding the content-aware metadata into a header portion of video file.

In some embodiments, step (e) comprises: storing the content-aware metadata on a computer server that is accessible via the Internet; and inserting into said video file a pointer to a location of said content-aware metadata on said computer server.

In some embodiments, step (e) comprises: storing the content-aware metadata in a metadata file that is separate from said video file but accompanies said video file; together with serving said video file to an end-user device, further serving also said metadata file to said end-user device.

In some embodiments, the content-aware metadata comprises a unique object identifier for each object; wherein the same unique object identifier tracks the same object across multiple frames of said video file.

In some embodiments, the content-aware metadata comprises a unique object identifier for each object; wherein the same unique object identifier tracks the same object across multiple frames of said video file; wherein at least one particular object, that was identified in said video file, (I) has a first importance score in a first frame of said video file, and (II) has a second, different, importance score in a second frame of said video file.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
a hardware processor that is configured to execute code, and that is operably associated with a memory unit that is configured to store code;
wherein the hardware processor is configured to perform a process comprising:
(a) receiving a video file, and receiving content-aware metadata about visual objects that are depicted by said video file;
(b) dynamically adjusting playback of said video file, on a video playback device, based cumulatively on at least (I) said content-aware metadata, and (II) dimensions of a screen-portion that is currently available for playback of said video file on said video playback device;
wherein step (a) comprises: receiving a video file which comprises at least (i) a video channel carrying video data, and (ii) a private channel carrying content-aware metadata; wherein both the video channel carrying the video data and the private channel carrying the content-aware metadata are internal components of said video file;
wherein step (b) comprises: extracting said content-aware metadata from said private channel of said video file, and dynamically adjusting the playback of the video based on content-aware metadata that was extracted from said private channel of said video file.

2. The system of claim 1,
wherein step (a) comprises: receiving content-aware metadata which describes, on a per-frame basis, (i) one or more visual objects that are depicted in each frame of the video, and (ii) one or more visual importance scores associated respectively with said one or more visual objects.

3. The system of claim 2,
wherein step (a) further comprises: receiving content-aware metadata which further describes, on a per-frame basis, (iii) in-frame boundaries of a shape that confines each of said visual objects.

4. The system of claim 3,
wherein step (a) further comprises: receiving content-aware metadata which further describes, on a per-frame basis, (iv) an object name associated with each of said visual objects;
wherein each of said visual objects is tracked across multiple frames of said video file based on said object name.

5. The system of claim 3,
wherein step (b) comprises:
dynamically adjusting an aspect ratio of playback of said video file on said video playback device, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

6. The system of claim 3,
wherein step (b) comprises:
dynamically and selectively cropping frames of said video file during playback of said video file on said video playback device, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

7. The system of claim 3,
wherein step (b) comprises:
selectively cropping frames of said video file prior to playback of said video file on said video playback device, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

8. The system of claim 3, wherein step (b) comprises:
selectively cropping frames of said video file prior to or during playback of said video file on said video playback device, by: (I) determining that a particular frame depicts a first visual object that is associated with a first visual importance score; (II) determining that said particular frame also depicts a second, different, visual object that is associated with a second, smaller, visual importance score; (III) dynamically cropping said particular frame into a cropped-frame which includes therein said first visual object and which excludes said second visual object.

9. The system of claim 3,
wherein step (b) comprises:
selectively cropping frames of said video file prior to or during playback of said video file on said video playback device, by: (I) determining that a particular frame depicts a first visual object that is associated with a first visual importance score; (II) determining that said particular frame also depicts a second, different, visual object that is associated with a second, smaller, visual importance score; (III) dynamically cropping said particular frame into a cropped-frame which includes therein said first visual object and which excludes said second visual object;
wherein the cropping further takes into account a dynamically-determined maximum offset of said first object, between two or more consecutive frames of said video file, to ensure smooth playback of said video without abrupt jumps of said first visual object.

10. The system of claim 3,
wherein step (b) comprises:
selectively cropping frames of said video file prior to or during playback of said video file on said video playback device, by: (I) determining that a particular frame depicts a first visual object that is associated with a first visual importance score; (II) determining that said particular frame also depicts a second, different, visual object that is associated with a second, smaller, visual importance score; (III) dynamically cropping said particular frame into a cropped-frame which includes therein said first visual object and which excludes said second visual object;
wherein the cropping further takes into account tracked in-frame positions of said first object across multiple consecutive frames, to ensure smooth playback of said video without abrupt jumps of said first visual object.

11. The system of claim 3, wherein step (b) comprises:
dynamically determining an in-frame location for adding a watermark in each frame of said video file during playback of said video file, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

12. The system of claim 3, wherein step (b) comprises:
dynamically determining an in-frame location for overlaying a content-element onto one or more frames of said video file during playback of said video file, based on a first content-aware metadata that indicates that a first in-frame visual object has a first visual importance score that is greater than or equal to a pre-defined threshold, and based on a second content-aware metadata that indicates that a second in-frame visual object has a second visual importance score that is smaller than said pre-defined threshold.

13. The system of claim 3, wherein step (b) comprises:
dynamically generating a summarized version of said video file, by selectively discarding one or more frames of said video file, wherein each frame that is discarded from said video file is a frame that lacks any visual object whose visual importance score is greater than a pre-defined threshold value.

14. The system of claim 3, wherein step (b) comprises:
dynamically generating a summarized version of said video file, by selectively discarding one or more frames of said video file, wherein each frame that is discarded from said video file is either: (i) a frame whose objects have, in aggregate, a cumulative visual importance score that is smaller than a pre-defined threshold value, or (ii) a frame whose objects have, in aggregate, a cumulative visual importance score that is equal to or greater than said pre-defined threshold value but said frame is part of a sequence of multiple neighboring frames having an average per-frame cumulative visual importance score that is smaller than said pre-defined threshold value.

15. The system of claim 3,
wherein step (b) comprises:
dynamically and selectively decreasing a playback speed, of a particular video-segment of said video file, based on content-aware metadata that indicates that said particular video-segment depicts one or more visual objects having an importance score that is greater than a pre-defined threshold value.

16. The system of claim 3,
wherein step (b) comprises:
dynamically and selectively increasing a playback speed, of a particular video-segment of said video file, based on content-aware metadata that indicates that said particular video-segment depicts one or more visual objects having an importance score that is smaller than a pre-defined threshold value.

17. The system of claim 3, wherein the process further comprises:
automatically generating and storing a modified version of said video file, which is content-aware cropped relative to said video file.

18. The system of claim 3, wherein the process further comprises:
automatically generating and displaying a modified version of said video file, which is content-aware cropped relative to said video file.

19. The system of claim 3, wherein the process further comprises:
automatically generating and storing a modified version of said video file, which is content-aware cropped relative to said video file;
wherein at least one frame of said modified version is a frame that was cropped in accordance with a first set of cropping boundaries that are determined based on a first importance score of a first visual object,
and wherein at least one other frame of said modified version is a frame that was cropped in accordance with a second, different, set of cropping boundaries that are determined based on a second importance score of a second visual object.

20. The system of claim 3, wherein the process further comprises:
automatically generating and storing a modified version of said video file, which is a content-aware summary of said video file, by selectively discarding frames from said video file based on said content-aware metadata.

21. The system of claim 3, wherein the process further comprises:
automatically generating and storing a modified version of said video file, which includes selective and differential watermarking of frames within said video file, by selectively embedding a watermark at different in-frame positions of different frames of said video file, based on said content-aware metadata.

22. The system of claim 3, wherein the process further comprises:
automatically generating and storing a modified version of said video file, which includes selective and differential overlaying of content-elements into frames of said video file, by selectively overlaying said content-elements at different in-frame positions of different frames of said video file, based on said content-aware metadata.

23. The system of claim 1, wherein the process further comprises:
based on said content-aware metadata, automatically defining on said video playback device a user-responsive in-screen area, which is displayed within said video, and that when selected or tapped or clicked or mouse-hovered by a user causes said video playback device to perform a specific action that is defined in said content-aware metadata.

24. The system of claim 2,
wherein the method is performed automatically by an end-user device that consumes digital video from a social network via a social network website or application.

25. A system comprising:
a hardware processor that is configured to execute code, and that is operably associated with a memory unit that is configured to store code;
wherein the hardware processor is configured to perform a process comprising:
(a) receiving a video file, and receiving content-aware metadata about visual objects that are depicted by said video file;
(b) dynamically adjusting playback of said video file, on a video playback device, based cumulatively on at least (I) said content-aware metadata, and (II) dimensions of a screen-portion that is currently available for playback of said video file on said video playback device;
wherein step (a) comprises: receiving said video file which is a first file, and receiving separately a second file which stores therein the content-aware metadata pertaining to said first file;
wherein step (b) comprises: extracting said content-aware metadata from said second file, and dynamically adjusting the playback of the video based on content-aware metadata that was extracted from said second file.

26. The system of claim 25,
wherein the process is performed automatically by a video playback program of an end-user device;
wherein the end-user device is a device selected from the group consisting of: a smartphone, a tablet, a smartwatch, a desktop computer, a laptop computer, a gaming device, a Virtual Reality (VR) gear, an Augmented Reality (AR) gear, a smart television.

27. The system of claim 25, wherein the process comprises:
(a) extracting from the content-aware metadata of said video file, an indication to open a pre-defined web-page or URL upon user engagement with a particular visual object in a particular frame of said video;
(b) during playback of said video file, detecting user engagement with said particular visual object in said particular frame, and automatically opening said pre-defined web-page or URL.

28. A system comprising:
a hardware processor that is configured to execute code, and that is operably associated with a memory unit that is configured to store code;
wherein the hardware processor is configured to perform a process comprising:
(a) receiving a video file, and receiving content-aware metadata about visual objects that are depicted by said video file;
(b) dynamically adjusting playback of said video file, on a video playback device, based cumulatively on at least (I) said content-aware metadata, and (II) dimensions of a screen-portion that is currently available for playback of said video file on said video playback device;
wherein step (a) comprises: receiving a video file which comprises at least (i) a video channel carrying video data, and (ii) a file header carrying content-aware metadata; wherein both the video channel carrying the video data and file header carrying the content-aware metadata are internal components of said video file;
wherein step (b) comprises: extracting said content-aware metadata from said file header of said video file, and dynamically adjusting the playback of the video based on content-aware metadata that was extracted from said file header of said video file.

29. The system of claim 28, wherein the process further comprises:
based on said content-aware metadata, automatically defining on said video playback device a user-responsive in-screen area, which is invisible within said video, and that when selected or tapped or clicked by a user causes said video playback device to perform a specific action that is defined in said content-aware metadata.

30. The system of claim 28, wherein the process further comprises:
during playback of said video on said video playback device, performing content-aware cropping and playback of said video by cropping-in N objects which have a highest importance score out of M objects recognized in said video, wherein N is a positive integer, wherein M is a positive integer, wherein N is smaller than or equal to M.

31. The system of claim 28, wherein the process comprises:
(a) extracting from the content-aware metadata of said video file, an indication to present particular object-related information upon user engagement with a particular visual object in a particular frame of said video;
(b) during playback of said video file, detecting user engagement with said particular visual object in said particular frame, automatically obtaining said particular object-related information, and automatically presenting said particular object-related information in proximity to said video.

32. A system comprising:
a hardware processor that is configured to execute code, and that is operably associated with a memory unit that is configured to store code;
wherein the hardware processor is configured to perform a process comprising:
(a) receiving a video file, and receiving content-aware metadata about visual objects that are depicted by said video file;
(b) dynamically adjusting playback of said video file, on a video playback device, based cumulatively on at least (I) said content-aware metadata, and (II) dimensions of a screen-portion that is currently available for playback of said video file on said video playback device;
wherein step (a) comprises: receiving a video file which comprises at least (i) a video channel carrying video data, and (ii) a file-portion storing a link to a location on a remote server which stores content-aware metadata pertaining to that video channel; wherein both the video channel carrying the video data and the file-portion storing said link are internal components of said video file;

wherein step (a) further comprises: obtaining from said location on remote server, the content-aware metadata pertaining to that video file, based on said link which is part of said video file;

wherein step (b) comprises: dynamically adjusting the playback of the video based on content-aware metadata that was obtained from said location on said remote server.

33. The system of claim 32, wherein the method is performed automatically by a web browser of an end-user device.

34. The system of claim 32, wherein the process further comprises:

during playback of said video on said video playback device, receiving a user selection of a particular screen-portion; determining which visual object is located within said screen-portion; and performing content-aware cropping and playback of said video by selectively cropping-in said visual object.

35. The system of claim 32, wherein the process comprises:

(a) extracting from the content-aware metadata of said video file, an indication to visually highlight a particular frame-region of a particular frame in said video;

(b) during playback of said video file, performing a visual highlighting of said particular frame-region of said particular frame based on said content-aware metadata.

* * * * *